(12) United States Patent
Stokes

(10) Patent No.: US 7,125,186 B1
(45) Date of Patent: Oct. 24, 2006

(54) WRITING INSTRUMENT WITH ENCLOSING STRUCTURE

(76) Inventor: Thomas Richard Stokes, 104 Rachel La., Yorktown, VA (US) 23692

( * ) Notice: Subject to any disclaimer, the term of this patent is extended or adjusted under 35 U.S.C. 154(b) by 0 days.

(21) Appl. No.: 10/641,019

(22) Filed: Aug. 15, 2003

(51) Int. Cl.
*A46B 5/02* (2006.01)
(52) U.S. Cl. .................... 401/8; 401/6; 401/7; 401/195
(58) Field of Classification Search .................... 401/6, 401/7, 8, 195; 16/430, 444, 446; D19/44
See application file for complete search history.

(56) References Cited

U.S. PATENT DOCUMENTS

| | | | |
|---|---|---|---|
| 1,063,301 A | | 6/1913 | Thomas |
| 2,285,000 A | * | 6/1942 | Wallace ...................... 401/6 X |
| 2,476,571 A | * | 7/1949 | Vierling ...................... 401/6 X |
| 2,538,155 A | | 1/1951 | Henneman |
| 4,127,338 A | * | 11/1978 | Laybourne ...................... 401/8 |
| D310,101 S | | 8/1990 | Gauthier |
| 5,270,909 A | * | 12/1993 | Weiss et al. ................. 362/208 |
| 5,320,438 A | * | 6/1994 | Yang .............................. 401/6 |
| 5,433,339 A | | 7/1995 | Sarver ........................ 220/756 |
| 5,468,083 A | * | 11/1995 | Chesar ........................... 401/6 |
| 5,878,834 A | | 3/1999 | Brainerd et al. |
| 5,913,479 A | | 6/1999 | Westwood, III ............. 24/298 |
| 5,983,686 A | * | 11/1999 | Lee ........................... 70/456 R |
| 5,989,206 A | | 11/1999 | Prosi et al. |
| 6,009,584 A | | 1/2000 | Padden |
| 6,045,281 A | | 4/2000 | Bunn et al. |
| 6,062,753 A | * | 5/2000 | Hadtke et al. ................. 401/6 |
| 6,161,974 A | * | 12/2000 | Nakagawa ...................... 401/6 |
| 6,223,372 B1 | * | 5/2001 | Barber ........................... 7/118 |
| 6,264,389 B1 | * | 7/2001 | Ducharme ............. 401/195 X |
| 6,287,608 B1 | | 9/2001 | Levin et al. |
| D466,791 S | | 12/2002 | Kelleghan |
| 6,499,899 B1 | | 12/2002 | Sawyer |
| 6,514,226 B1 | | 2/2003 | Levin et al. |
| 6,533,747 B1 | | 3/2003 | Polaschegg et al. |
| 6,547,098 B1 | | 4/2003 | Kaye |
| D476,730 S | | 7/2003 | O'Mahony et al. |
| D477,867 S | | 7/2003 | O'Mahony et al. |
| 6,585,675 B1 | | 7/2003 | O'Mahony et al. |
| D479,320 S | | 9/2003 | O'Mahony et al. |
| D484,770 S | * | 1/2004 | Green .......................... D8/99 |
| 6,685,664 B1 | | 2/2004 | Levin et al. |
| 6,689,083 B1 | | 2/2004 | Gelfand et al. |
| 6,702,496 B1 | * | 3/2004 | Park ........................... 401/131 |

(Continued)

FOREIGN PATENT DOCUMENTS

EP 0 619 167 10/1994

(Continued)

OTHER PUBLICATIONS

"The Writer's Edge", The Writer's Edge Fisher Space Pen Store Private Label Pen Collection, pp. 1-3, Jun. 4, 2003.

(Continued)

*Primary Examiner*—Khoa D. Huynh
(74) *Attorney, Agent, or Firm*—Nixon & Vanderhye P.C.

(57) ABSTRACT

A writing instrument having a writing leg having a writing tip extending from an end of the writing leg; a gate leg; a joint between the writing leg and the gate leg, wherein the joint is proximate to the writing tip and is to be grasped between a forefinger and thumb, and a third leg attached at one end to the second leg and at another end to the writing leg at a location distal to the writing tip, wherein said writing, second and third legs define an aperture sufficiently large to receive five fingers of a hand grasping the second leg.

26 Claims, 29 Drawing Sheets

U.S. PATENT DOCUMENTS

| | | |
|---|---|---|
| 6,706,007 B1 | 3/2004 | Gelfand et al. |
| 6,715,898 B1 * | 4/2004 | Huang .................. 362/191 |
| 6,773,412 B1 | 8/2004 | O'Mahony et al. |
| 6,979,143 B1 | 12/2005 | Goldberg |
| 2002/0017540 A1 | 2/2002 | Ewing |
| 2002/0179023 A1 | 12/2002 | Axel |
| 2003/0025056 A1 | 2/2003 | Atchley et al. |
| 2003/0066137 A1 | 4/2003 | Johnson et al. |
| 2003/0106190 A1 | 6/2003 | Christianson |
| 2003/0111496 A1 | 6/2003 | Abbott |
| 2003/0127477 A1 | 7/2003 | Williams |
| 2004/0006850 A1 | 1/2004 | Wax |
| 2004/0085757 A1 * | 5/2004 | Huang .................. 362/109 |

FOREIGN PATENT DOCUMENTS

| | | |
|---|---|---|
| JP | 2001-334547 | 12/2001 |

OTHER PUBLICATIONS

Brian E. Jaski et al., "Peripherally Inserted Veno-Venous Ultrafiltration For Rapid Treatment of Volume Overloaded Patients", Journal of Cardiac Failure vol. 9, No. 3, 2003, pp. 227-231.
CARABINER ASI/79840 (Pre-2003) (4 sheets).
Fiskars Hip Clip "Study Buddy" Highlighter (Pre-2003) (1 sheet).
Fiskars Hip Clip Pen (Pre-2003) (3 sheets).

* cited by examiner

WRITING INSTRUMENT WITH ENCLOSING STRUCTURE

BACKGROUND OF THE INVENTION

This invention relates to the field of writing instruments and, in particular, to integral attachment and removable attachment devices and handles for personal writing instruments.

Personal writing instruments are devices such as pencils, pens, markers, pen-type data entry devices instruments, crayons, chalk holders, electronic data recording devices, styluses for computers, e.g., personal digital assistants (PDA), and other similar devices. These writing instruments are typically held by the hand of a person when writing. A writing instrument is generally grasped between the thumb and forefinger(s) of the hand. The shape of a writing instrument should provide a comfortable grasp for the hand and facilitate writing.

Clasps, latches, lanyards, gates and other attachment devices are commonly used to secure a writing instrument to a person, fixture or device. Many of the attachment devices do not reliably secure the writing instrument. For example, the clasp on a pen holds the pen in a shirt pocket, but allows the pen to slide out of the pocket and become lost. Many other conventional attachments for writing instruments tend to be separate or detachable from the writing instrument. For example, writing instruments have been attached by a lanyard to a carabiner. While the carabiner on a lanyard provides a secure and locking attachment for the writing instrument, it has several difficulties including: the writing instrument is not protected by the carabiner; the writing instrument may swing in a pendulum manner from the lanyard or carabiner; the writing instrument and carabiner become tangled with each other and other devices; the carabiner and writing instrument form an unattractive and awkward assembly; the carabiner interferes with the instrument during writing, and the writing instrument and carabiner are not easy to hold, especially by persons not able to grasp the instrument between their fingers and thumb. Accordingly, there is a long-felt need for a clasp, gate or other attachment device for a writing instrument that overcomes these difficulties without sacrificing a comfortable grip on the writing instrument.

BRIEF DESCRIPTION OF THE INVENTION

In a first configuration, the invention is a writing instrument comprising: a writing leg having a writing tip extending from an end of the writing leg; a second leg; a joint between the writing leg and the second leg, wherein the joint is proximate to the writing tip and is to be grasped between a forefinger and thumb, and a third leg attached at one end to the second leg and at another end to the writing leg at a location distal to the writing tip, wherein said writing, second and third legs define an aperture. A gate segment may be included in the second or third leg. The gate segment may incorporate any of a variety of gates including: a pivoting gate, a sliding latch gate, a wire gate and a flexible appendage gate. The aperture may also be enclosed by a solid loop enclosing structure with no gate at all.

In a second configuration, the invention is a writing instrument comprising: a carabiner body having a writing leg with a writing tip, and a gate leg having a gate segment, wherein the gate leg joins to the writing leg proximate to the writing tip. The gate segment may incorporate one of various types of gates.

In a third configuration the invention is a writing instrument comprising: a carabiner body having a hollow writing leg adapted to receive a writing device having a writing tip at one end of the writing device; a gate leg having a gate, wherein the gate leg joins to the writing leg proximate to the writing tip, when the writing device is inserted into the writing leg, and wherein said writing instrument has a first writing mode in which the writing device and carabiner body are assembled when held in a hand of a writer, and a second writing mode in which the writing device is separated from the body when the writing device is held in the hand. The gate may be in the form of, for example, a pivoting gate, sliding latch gate, wire gate and flexible appendage gate. The aperture may also be enclosed by a solid loop enclosing structure with no gate.

In a fourth configuration the invention is a writing instrument comprising: a writing leg having a writing tip at an end of the shaft; a handle at opposite ends each attached to the writing leg, and an aperture defined by the writing leg and the handle, wherein the aperture is sufficiently large to receive fingers of a hand grasping the writing instrument. The handle may include a gate segment incorporating one of various types of gates.

In a fifth configuration the invention is a writing instrument comprising: a writing device having at one end a writing tip, and a gate loop at an end of the writing device opposite to the writing tip, wherein the gate loop is rigidly fixed to the writing device. The gate loop may include one of various types of gates.

In a sixth configuration the invention is a gate loop for attaching to a shaft of a writing device, said loop comprising: a ring loop defining an aperture within said loop; and a stem extending outward from the ring loop and attachable to the shaft of the writing device. The gate loop may include one of various types of gates.

In a seventh configuration the invention is a detachable attachment device for a writing device comprising: at least one sleeve attachable to a shaft of the writing device; a gate leg having a first end joined to the at least one sleeve and an opposite end joined to a third leg, wherein said gate leg has a gate segment, and said third leg spans the gate leg and the at least one sleeve. The gate segment may incorporate one of various types of gates.

DETAILED DESCRIPTION OF THE INVENTION

Figure 1:
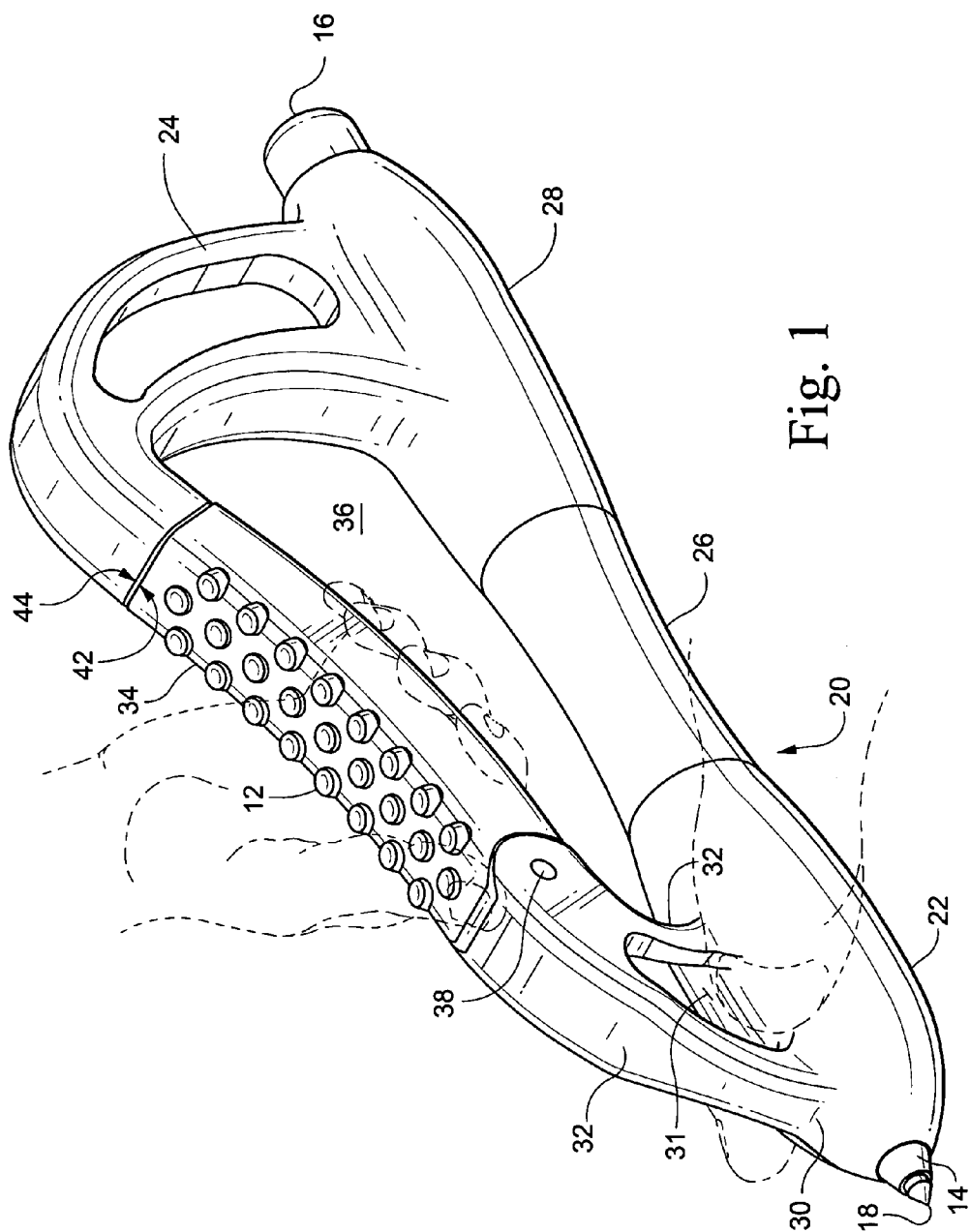
FIGS. 1, 2 and 3 are perspective, top and front views, respectively, of a first embodiment of the writing instrument.
Figure 2:
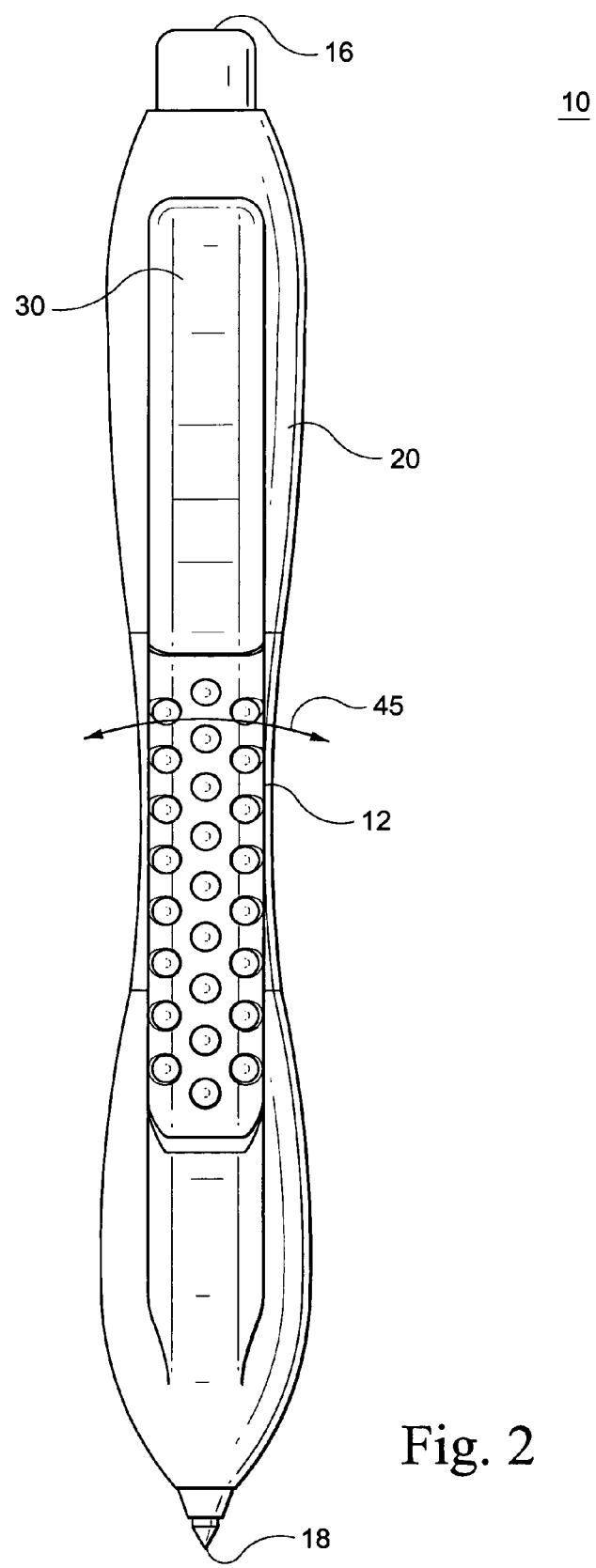
Figure 3:
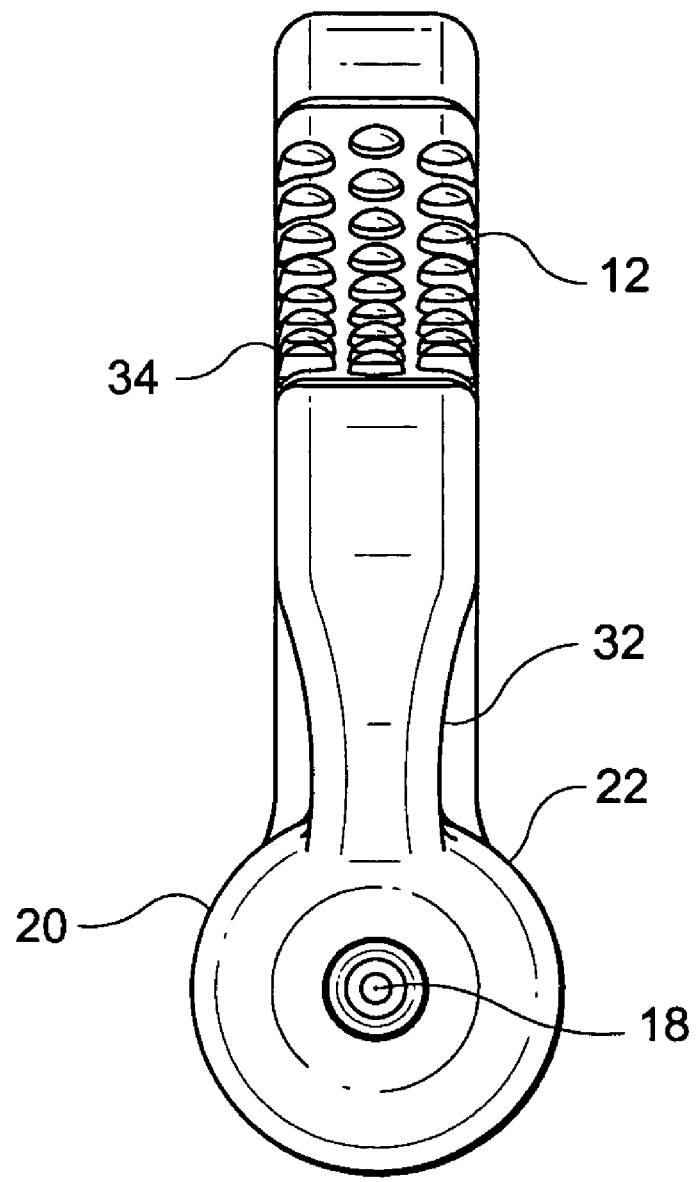

FIGS. 1, 2 and 3 are perspective, top and front views, respectively, of a first embodiment of a writing instrument 10 having a gate leg 12 and a writing device 14 in a writing leg 20. The writing device 14 may include a slender cylindrical shaft 16 containing an internal ink reservoir, a supply of writing graphite or forming the shaft of a stylus. There is generally a writing tip 18 at one end of the shaft 16. The writing tip may apply ink or graphite to paper as the writing tip slides across paper, for example. The writing tip may be a stylus that electromagnetically interacts with a computer display. The writing device may slide into an axial conduit extending through a conduit in the writing leg 20. The writing device 14 may be replaced by sliding the device rearwardly out of the conduit and inserting a new writing device 14 into the conduit.

The writing leg 20 is intended to be grasped by the hand of a person during writing. The writing leg may be shaped to provide a comfortable grasp between the thumb and fingers when held in the hand. The writing leg 20 is a generally straight shaft shaped to be comfortably held in the hand of a person while writing. For example, the writing leg may have a first large diameter section 22 proximate to the writing tip 18 that provides a thick grip to be held between the thumb and forefinger of a hand. The large diameter section 22 also provides a large surface to join the writing leg to the gate leg 12 of the writing instrument. The writing leg may also include a thin, necked section 26, which fits into the web of the hand between the thumb and forefingers. The writing leg may also have a second large diameter region 28 positioned towards an end of the leg 20 distal to the writing tip 18. The large diameter section 28 may provide a large surface to join a third leg 24 to the writing leg.

A joint 30 attaches the gate leg 12 to the writing leg 20. See, e.g., FIGS. 1 and 4. The joint 30 is located where the thumb and finger(s) grasp the writing leg. The joint 30 extends radially outward from the writing leg and is in a plane defined by legs 12 and 20. To accommodate the finger and thumb, recesses 31 are provided on each side of the writing leg at the joint 30, in the embodiment shown in FIG. 1. The thumb and finger(s) can rest in the recesses 31 when the hand holds the large diameter section 22 of the writing leg. The joint 30 has ribs 32 on either side of the recesses to provide structural support for the gate leg and the joint, and to form walls to the recesses 31.

The gate leg 12 has a gate segment 34 with a first position (as shown in FIGS. 1 through 3) in which a gate segment 34 is aligned with the gate leg 12. The gate segment 34 may be a section of the gate leg having a dimpled or knurled grip. The gate segment (for this and other embodiments) may include a pivoting gate, sliding latch gate, flexible appendage gate or other gate device. The aperture 36 may also be enclosed by a solid loop enclosing structure with no gate.

The gate leg 12, and especially its grip, allows the writing instrument 10 to be grasped by a person holding the gate leg with the fingers extending through the aperture 36 formed between the legs of the writing instrument. By grasping the writing instrument with the palm of the hand adjacent to the grip of the gate segment 34 and the forefingers and thumb extending through the aperture 36, the writing instrument may be carried or may be held for writing. Because the legs 12, 20 and 24 are rigid with respect to the writing device 14, the writing device does not swing with respect to the legs. Moreover, holding the writing instrument by the gate leg 12 (which forms a handle) for writing may be suitable for persons having weak finger strength and who are unable to hold a writing pen in a normal manner.

The gate segment 34 may have an open position achieved by pivoting the gate segment 34 about a pivot point 38 on the gate leg 12. In the open position, a gap 40 forms between the opposite end 42 of the gate segment and the fixed end 44 of the gate leg 12. This gap 40 allows the writing instrument to be clipped onto a backpack or other device to secure the writing instrument. The gate segment 34 may pivot inwardly towards the writing leg 20, may pivot to the side as indicated by arrow 45, pivot outwardly and away from the writing leg; or bend away from the fixed end 44 and resiliently swing back to the end when released. The appropriate gate mechanism may be selected during the design of the writing instrument and in view of the intended purpose of the writing instrument. For example, the gate mechanism may allow the mating ends 42, 44 of the gate segment 34 and gate leg 12 to clip onto a shirt pocket, such that the ends grip a shirt or pants pocket material.

The gate segment allows the writing instrument to be secured during times of activity such as jogging, walking, working in precarious positions, or during sporting activities such as biking, hiking, sailing, climbing. During these activities, it is beneficial to secure the writing instrument to a person or to another device. It is also beneficial that the writing instrument does not swing with respect to the gate mechanism. While the entire writing instrument may swing about the person or device to which it is attached, the extent of swinging is greatly reduced or eliminated as compared to writing instruments secured by a lanyard to a person or device.

The third leg 24 connects the ends of the second and writing legs. The third leg may include ribs for structural strength and aesthetics. The gate, writing and third legs 12, 20, 24 may be arranged such that the writing instrument is a carabiner with an integral writing device. The writing instrument may be formed of metal (similar to a mountain climbing carabiner), molded plastic or other materials. Surfaces of the writing instrument may be knurled, dimpled or soft to provide a good grip to the hand. The gate may have a spring loaded locking mechanism requiring unlocking before the gate will open.

Figure 4:
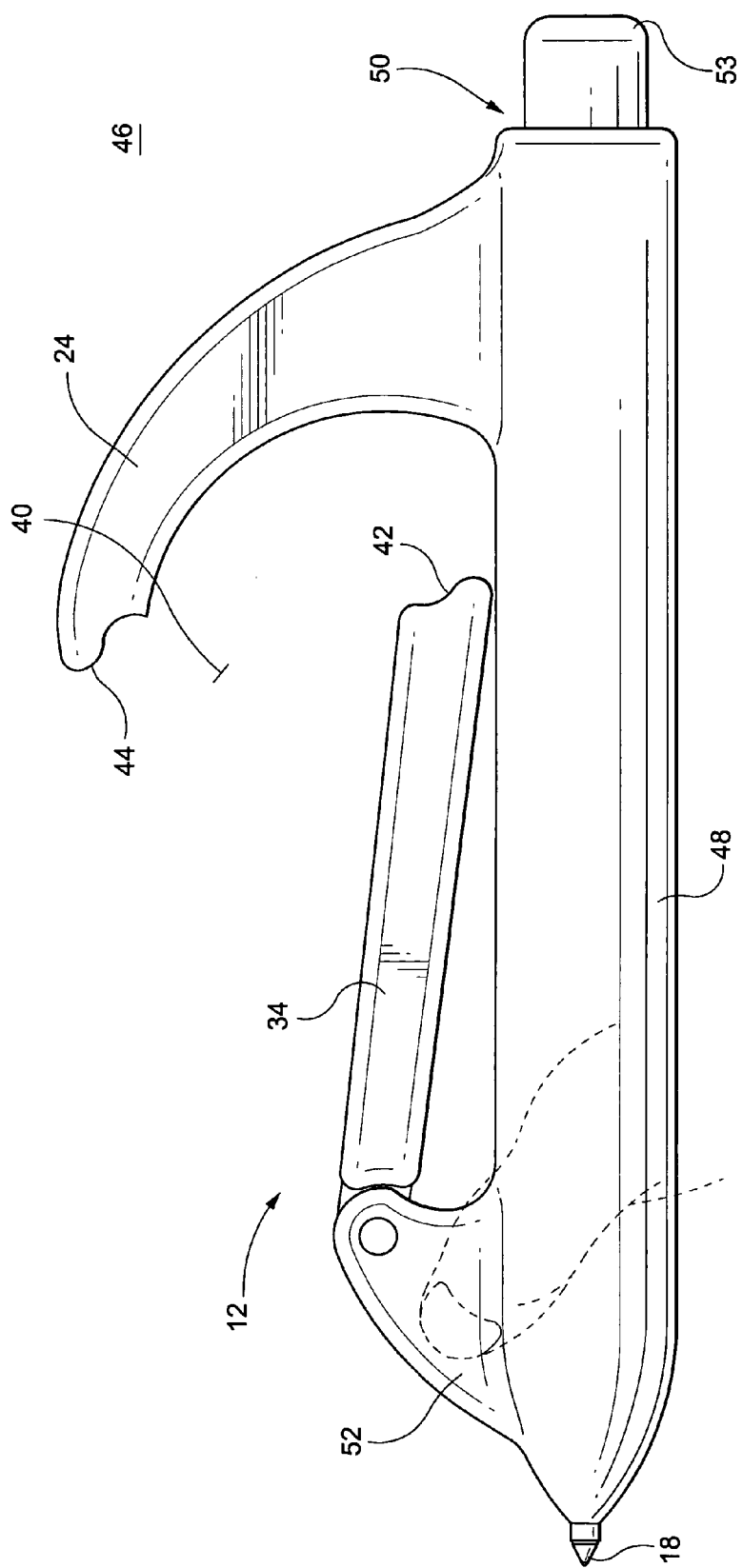
FIG. 4 is a side view of a second embodiment of the writing instrument.

FIG. 4 is a side view of a second embodiment 46 of the writing instrument. In this embodiment, the gate segment 34 is shown in an open position. The gap 40 between the ends 42, 44 of the gate segment 34 and the third leg 24 allows the writing instrument to be connected to some other device or to clip onto a sheet of fabric or to the edge of a panel. The second embodiment 46 has a writing leg 48 that is a substantially smooth and straight cylindrical section. This cylindrical writing leg 48 has an interior conduit 50 into which has been inserted a removable cylindrical writing device 53. The gate leg 12 has a joint 52 with the writing leg that is thin as compared to the thickness of the writing leg. Because the joint 52 is thin, a person may grasp the writing instrument by holding the writing leg 48 in his hand and grasping the thin joint 52 with his forefinger and thumb. A recess for the thumb and fingers may not be needed in the thin joint.

Figure 5:
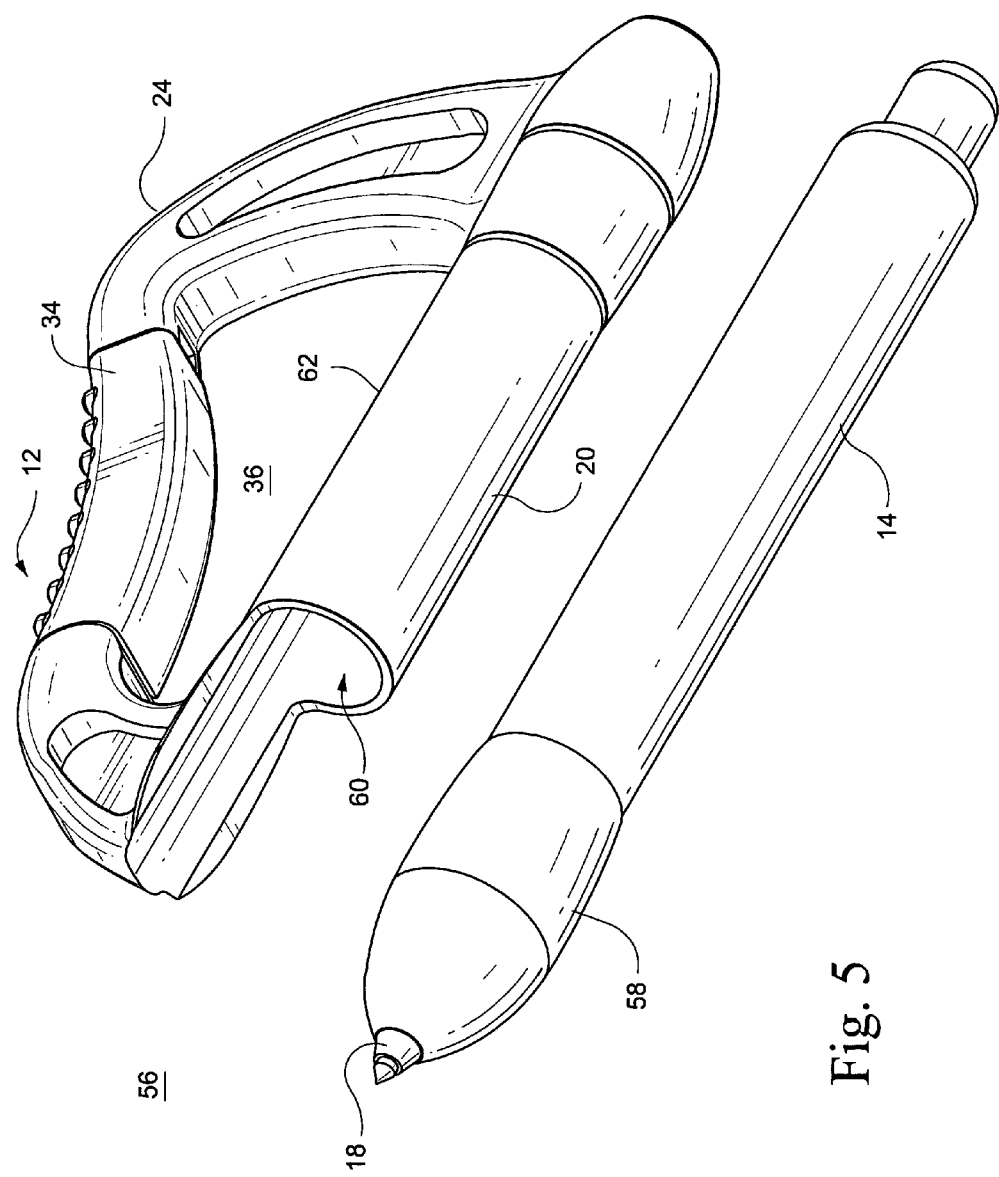
FIG. 5 is an exploded view of a third embodiment of the writing instrument.

FIG. 5 is a perspective view of a third embodiment 56 of the writing instrument, which is similar in many respects to the first embodiment 10. However, the writing device 14 has a bulbous nose 58 which includes the writing tip 18 and forms a portion of the exterior surface of the writing leg 20. The writing device 14 inserts into a hollow conduit 60 a cylindrical body 62 of the writing leg. The writing device 14 may be removed from the cylindrical body 62 for writing. Alternatively, the assembled writing instrument 56 may be used for writing. The aperture 36 formed by the legs of the writing device may receive the fingers and thumb of a hand that grip the gate leg 12.

Figure 6:
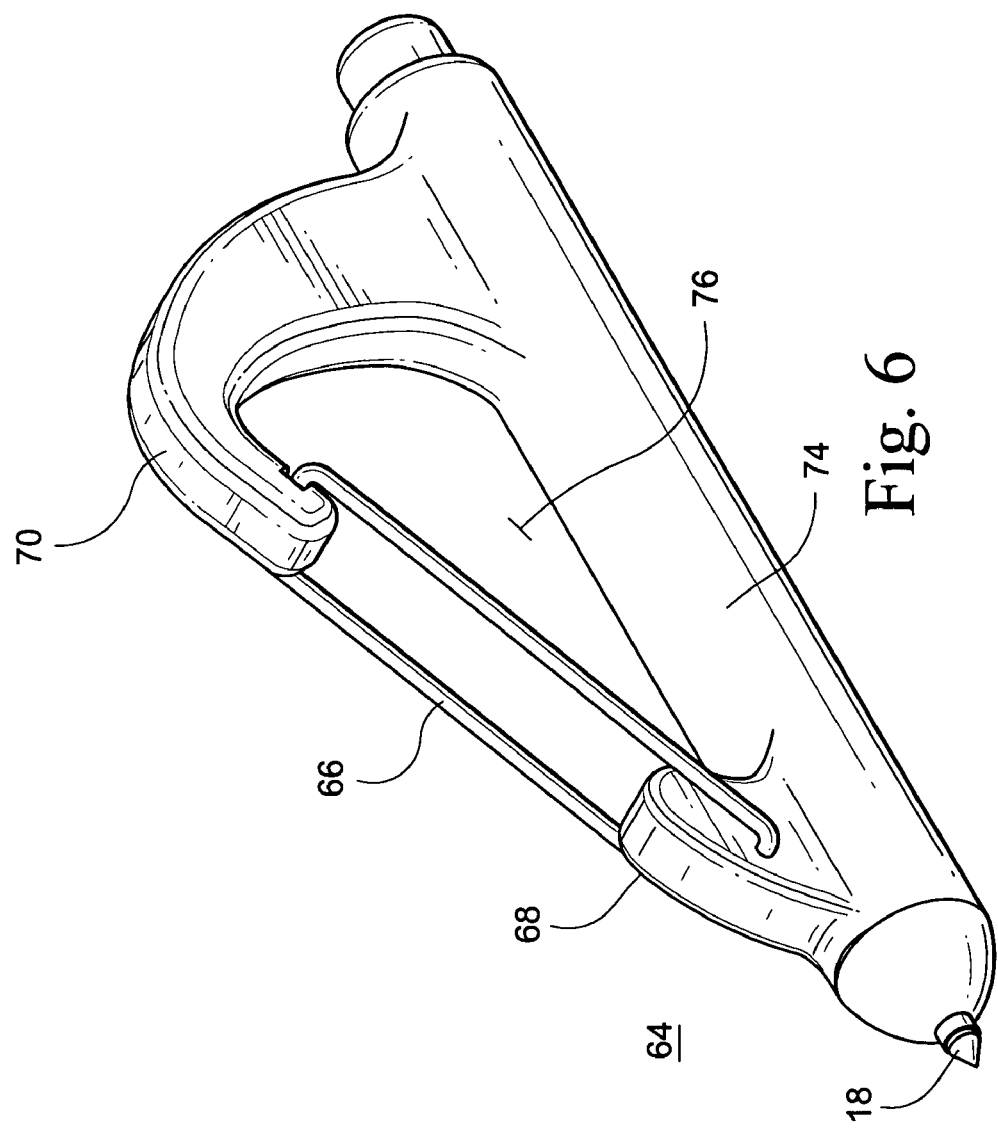
FIGS. 6 and 7 are perspective and side views respectively of a fourth embodiment of the writing instruments.
Figure 7:
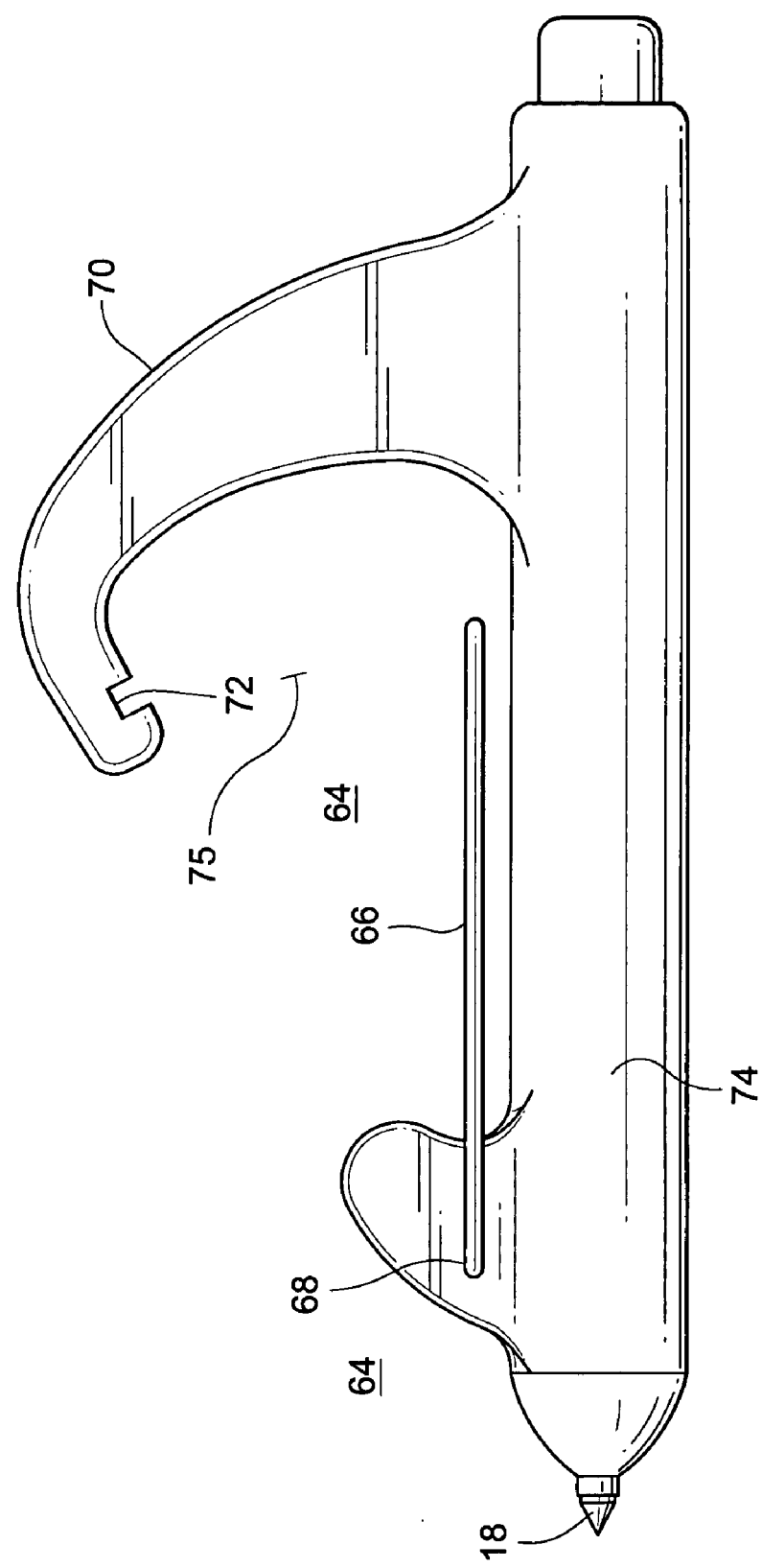

FIGS. 6 and 7 show a fourth embodiment 64 of the writing device having a wire frame gate leg 66. The wire frame gate leg 66 is pivotably attached to the joint 68 with the writing leg 74. An opposite end of the wire frame 66 is releasably attached to an end of the third leg 70, which has a hook 72 to receive the wire frame. The joint 68 may be formed on the shaft of the writing leg 74 at either a location proximate to the writing tip 18 (as shown in FIG. 7) or at another location on the first leg 74 closer to the third leg 70 and distal from the writing tip 18. By moving the joint 68 along the writing leg towards the third leg 70, the length of the wire frame 66 is reduced. An advantage of the wire frame, gate leg 66 is that it allows the writing instrument to be easily latched to a larger device which has a protrusion which fits through the aperture 76 defined by the writing leg 74, gate leg 66 and third leg 70. Gap 75 allows the writing instrument to be clipped onto a backpack or other device to secure the writing instrument.

Figure 8:
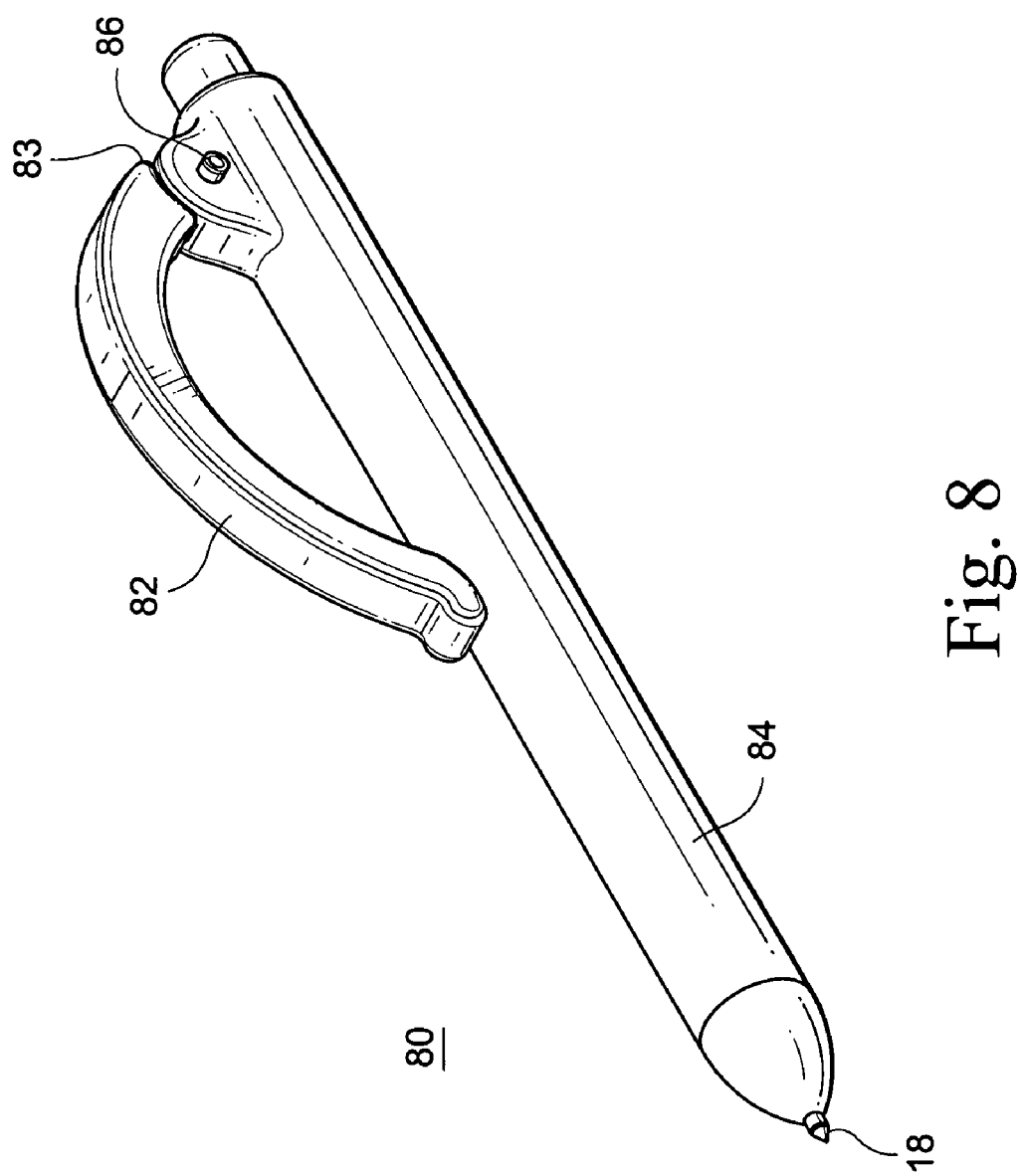
FIGS. 8, 9 and 10 are perspective views of a fifth embodiment of the writing instrument.
Figure 9:
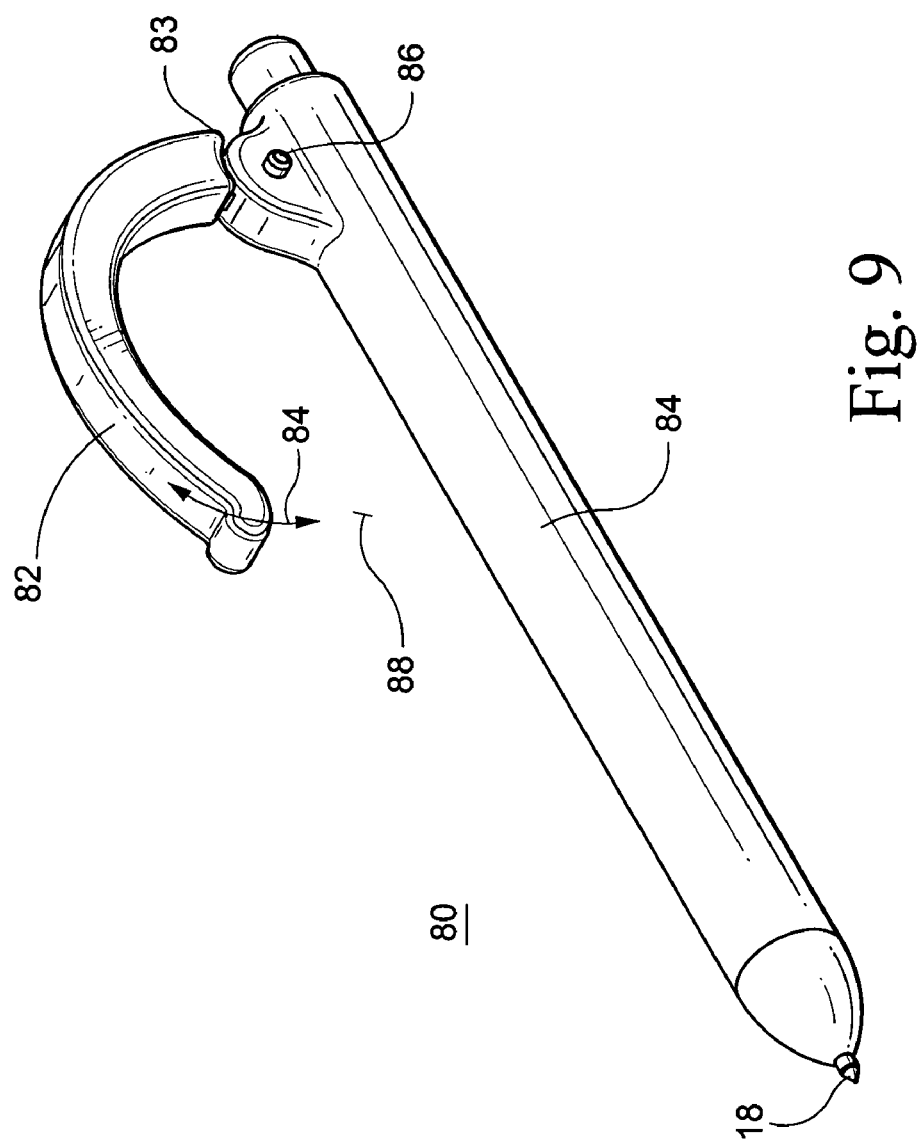
Figure 10:
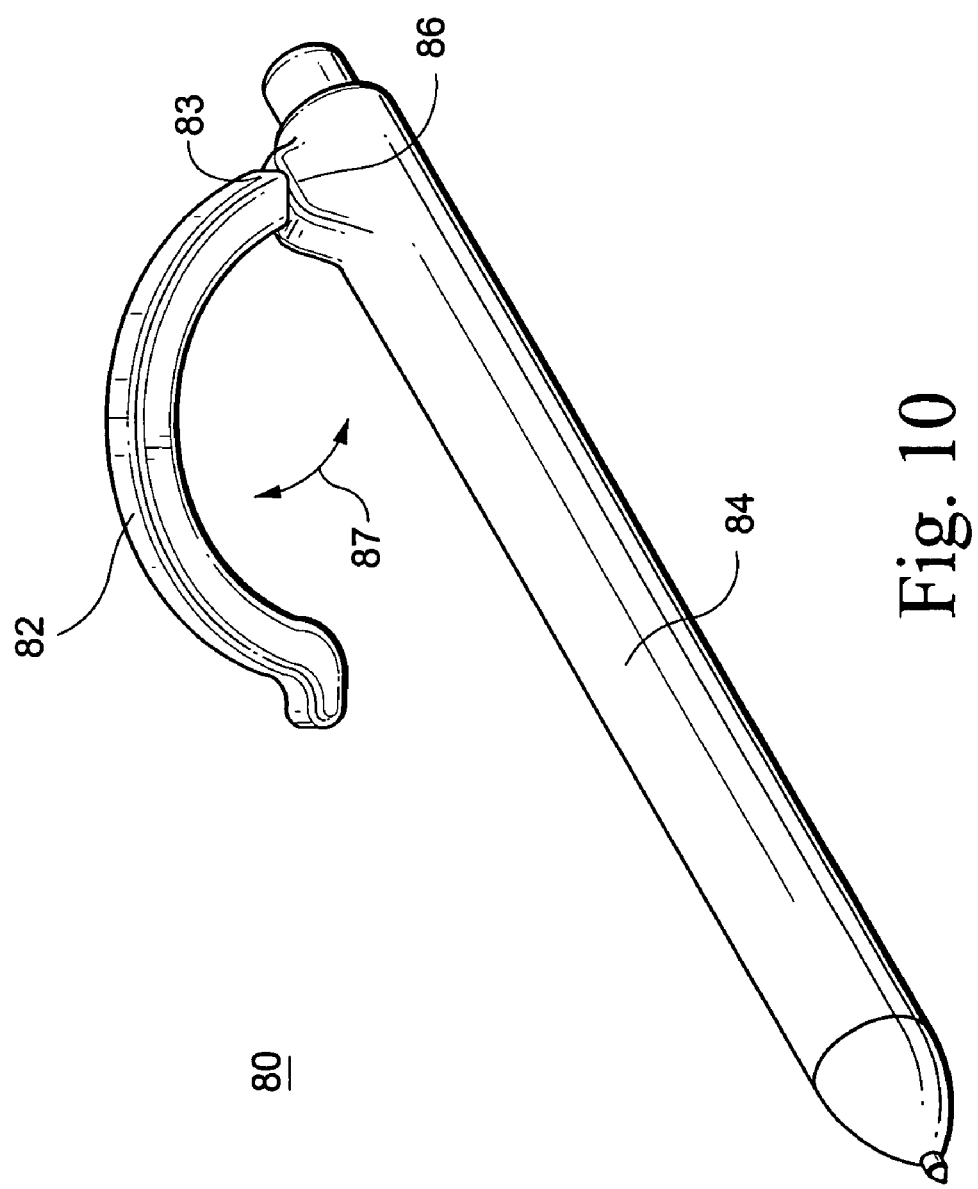

FIGS. 8, 9 and 10 show a fifth embodiment 80 of the writing device having a molded plastic gate leg 82. The gate leg 82 has a first end 83 which is joined to an end of a writing leg 84 distal to the writing tip 18. The gate leg may pivot up and down (arrow 84) or sideways (arrow 87). The gate leg 82 may be integrally molded with the writing leg 84, or pivotably attached (as shown) at a joint 86 between the legs. If integral with the writing leg, the gate leg 82 may be formed of a resilient ductile material, such as a rubberized plastic, that allows the gate leg to be deformed or twisted away from the writing leg 84. When the gate leg 82 is pivoted or pushed aside, a gap 88 forms to allow the writing instrument to be latched to another device. FIGS. 8 and 9 show a cantilever arm 82 which pivots (see arrow 84) in a plane defined by the writing leg and the cantilever arm to create an opening. FIG. 10 shows a sideways rotating arm 82 which moves (see arrow 87) to create an angular difference between the writing leg and the moving arm.

Figure 11:
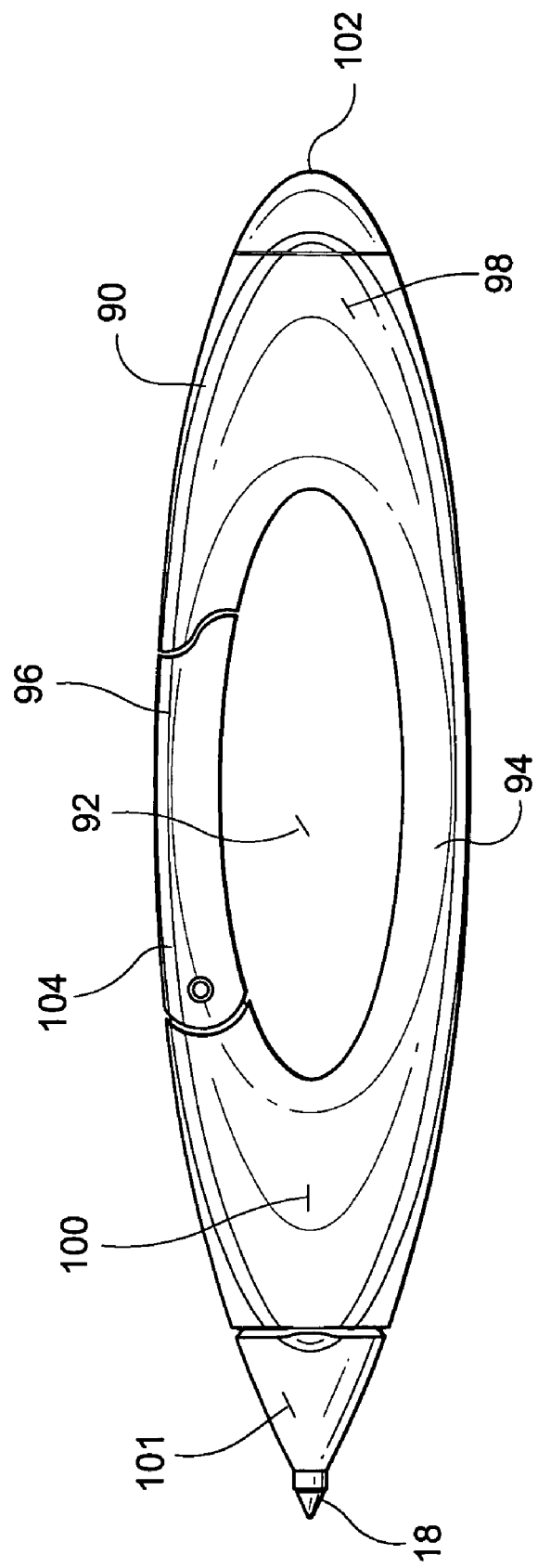
FIGS. 11 and 12 are side views of a sixth embodiment of the writing instrument.
Figure 12:
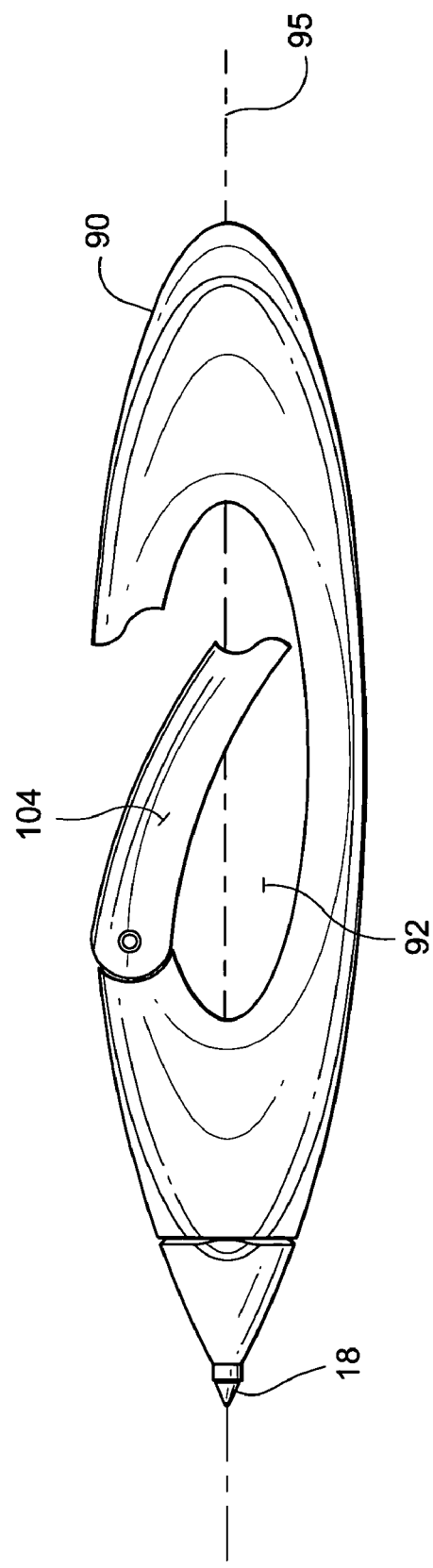

FIGS. 11 and 12 show side views of a sixth embodiment 90 of the writing instrument, having a generally elliptical outer perimeter. The aperture 92 is generally axially aligned along a center line 95 of the writing instrument 90. The writing leg 94 and gate leg 96 extend along opposite sides of the aperture 92 and are generally parallel to the centerline 95. The aperture 92 may be large enough to receive the forefingers of a hand grasping the instrument by the gate leg 96. The legs are joined at their opposite ends at joints 98 and 100 respectively. The joint 100 forms a housing for the writing tip 18 and an associated detachable writing device 101. The joint 98, at the opposite end of the instrument, may include an end cap 102 to receive ink, to re-supply the writing tip. The gate leg 96 may include a pivoting gate segment 104 that is attached at one end to the joint 100. The gate segment 104 may pivot inwardly to allow the writing instrument 90 to be attached to another device.

Figure 13:
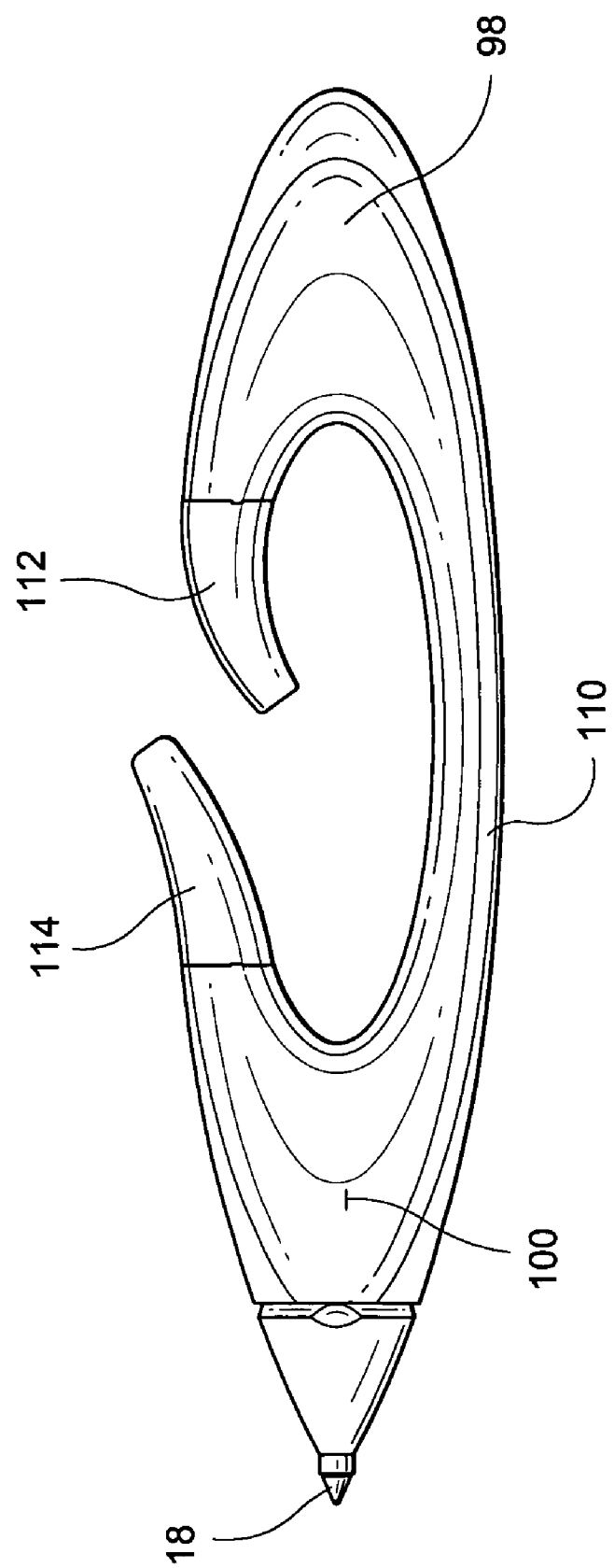
FIG. 13 is a side view of a seventh embodiment of the writing instrument.

FIG. 13 shows a seventh embodiment 110 of the writing instrument, and is a variation of the sixth embodiment 90. In the writing instrument 110, the gate leg is formed by two deformable leg segments 112, 114. These segments 112, 114 are each attached at one end to one of the joints 98, 100 of the writing instrument 110. The opposite ends of the leg segments 112, 114 extend towards each other. In a rest position, the leg segments 112, 114 are aligned and touch or nearly touch each other. The ends of these leg segments can be used to pinch a cloth sheet or to secure the instrument to a loop. These leg segments 112, 114 may be pushed apart, as shown in FIG. 13, so that the writing instrument 110 may be attached to another device. When the leg segments are released they move back to an aligned position. The leg segments 112,114 are an example of a flexible plastic appendage gate.

Figure 14:
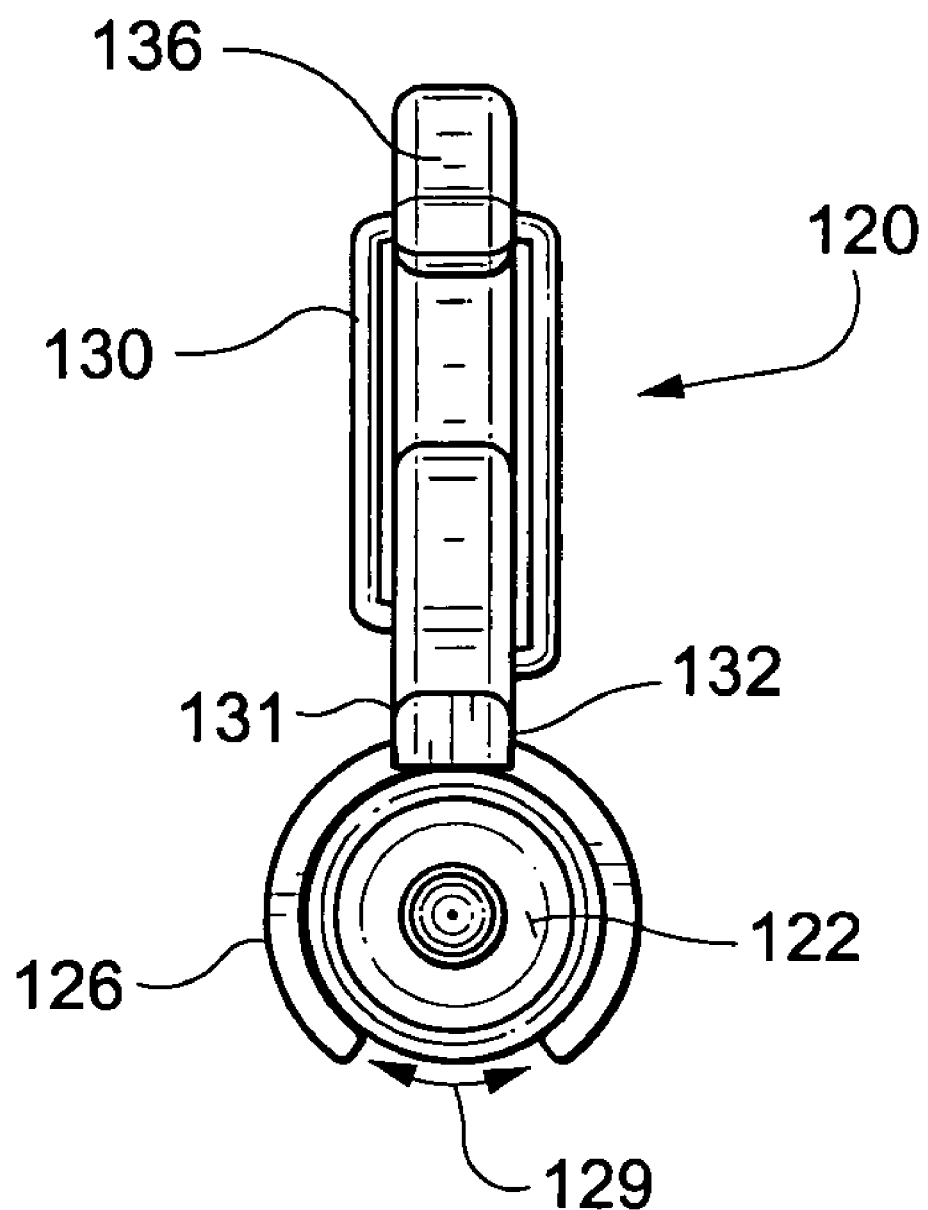
FIGS. 14, 15 and 16 are front, perspective and side views respectively of a conventional writing instrument with a mountable gate.
Figure 15:
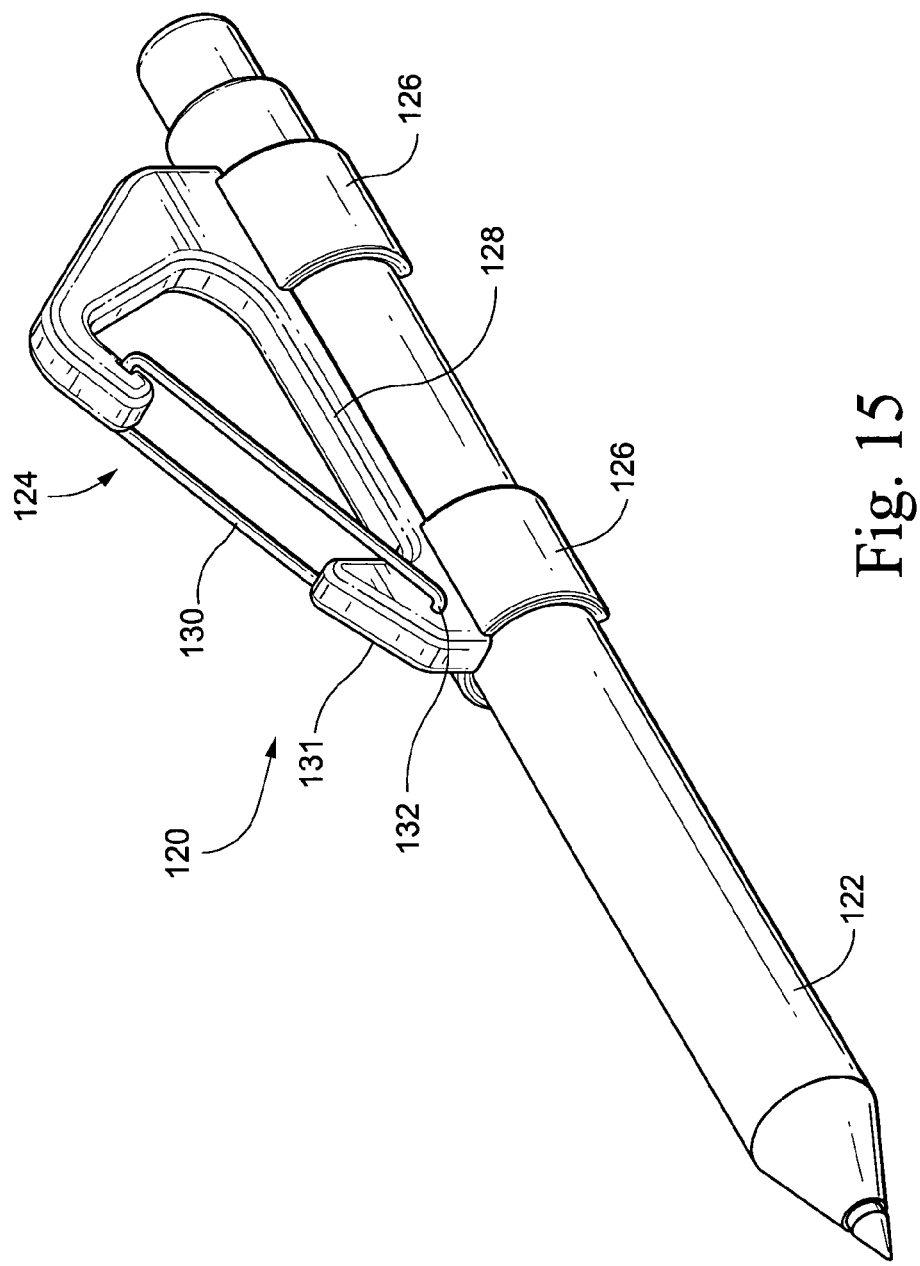
Figure 16:
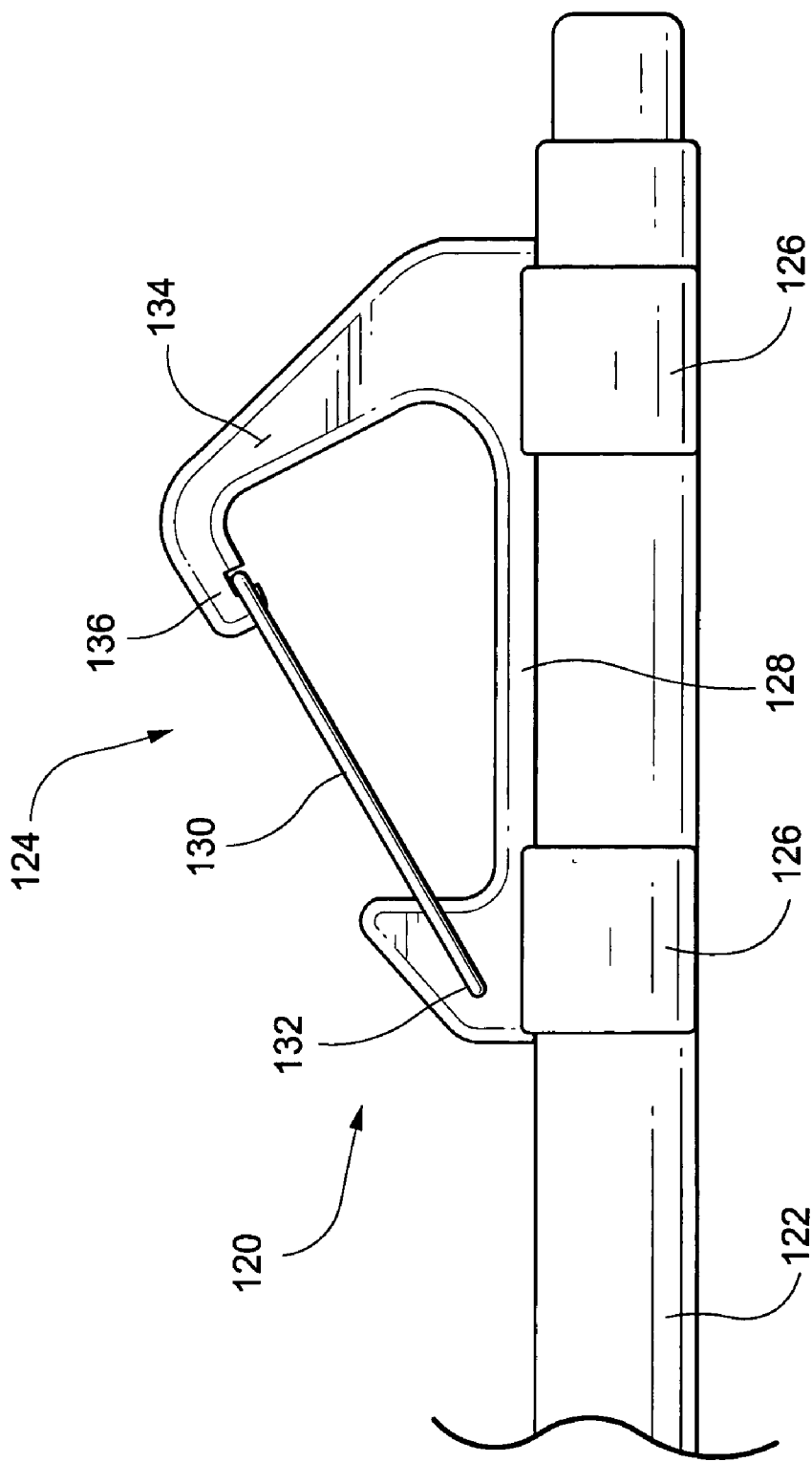

FIGS. 14, 15 and 16 show an eighth embodiment 120 of the writing instrument which is an assembly of a conventional writing device, such as a pen, 122 and a slide or snap on gate mechanism 124. The gate mechanism 124 includes a pair of sleeves 126 that are attached to each other by a rib span 128. The sleeves each have an aperture to receive the shaft of the writing device. A gap 129 in each sleeve allows them to be snapped onto the shaft of a pen. A first sleeve 126 has a boss 131 which is attached to a wire frame gate leg at pivot point 132. The other sleeve 126 includes a third leg 134 having a hook 136 to detachably receive the wire frame gate leg 130. The boss 131 and third leg 134 are aligned in a plane that includes the writing device 122. The wire gate 130 may be a spring loaded plastic gate.

Figure 17:
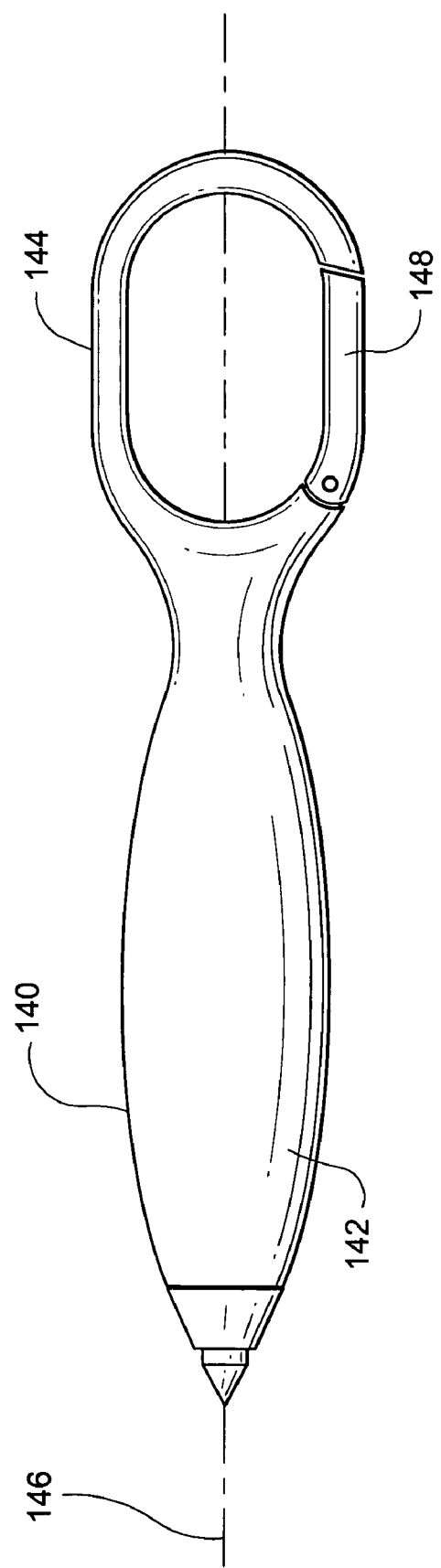
FIGS. 17 to 20 are side views and a perspective view (FIG. 18) of a ninth embodiment of the writing instrument.
Figure 18:
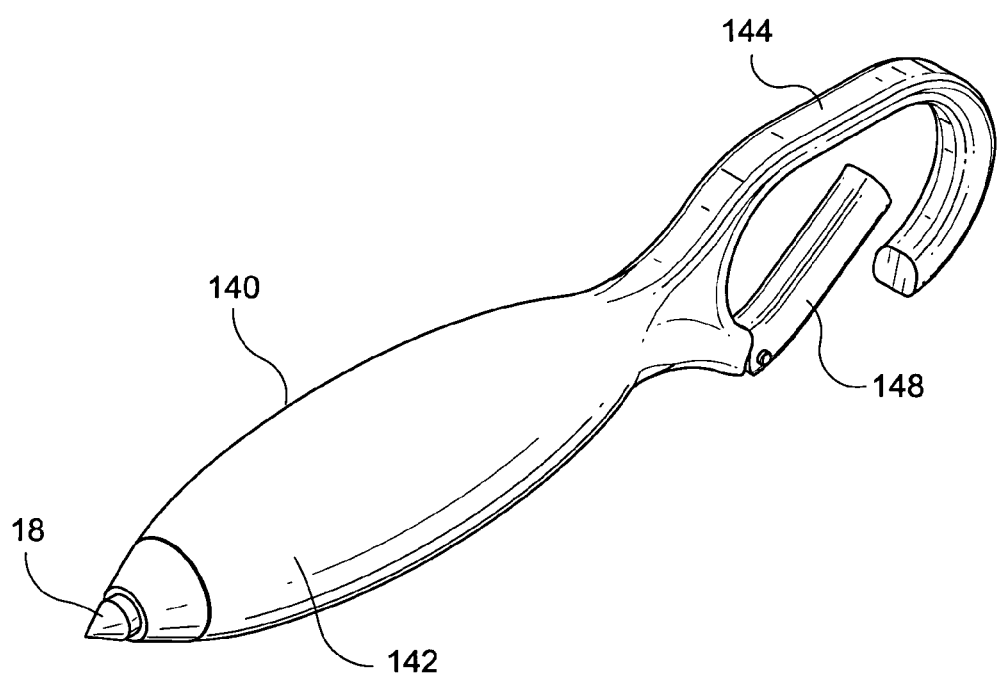
Figure 19:
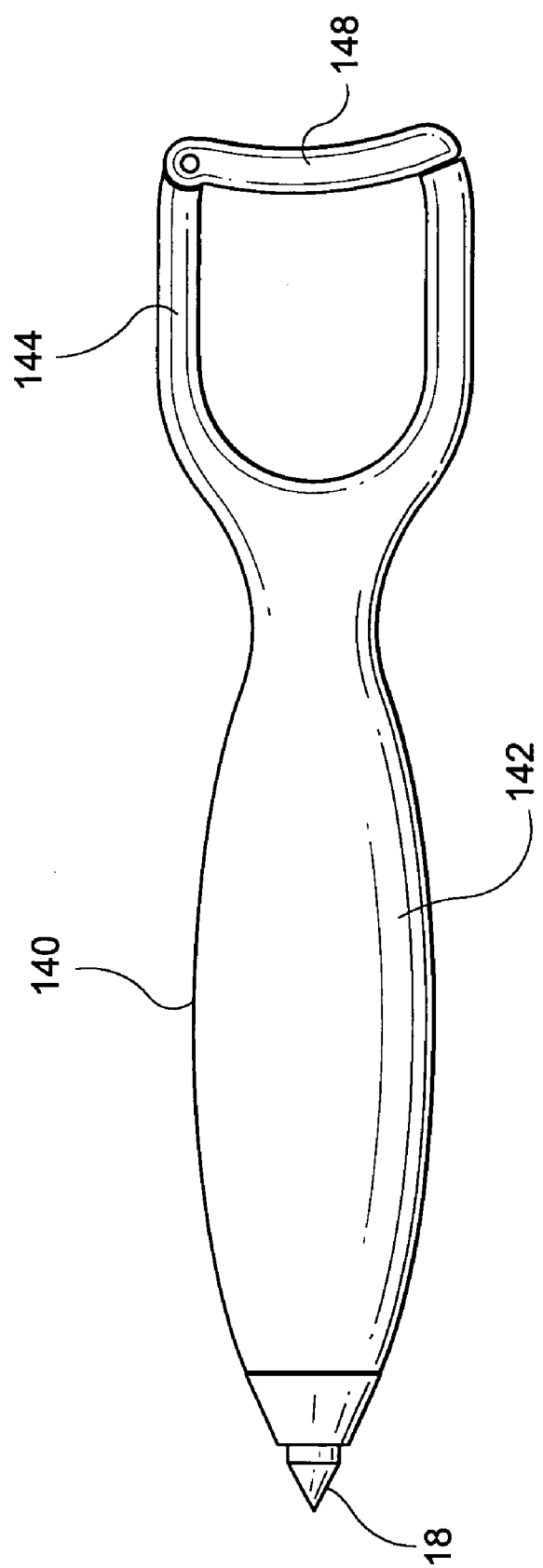

FIGS. 17 to 20 are various views of a ninth embodiment 140 of the writing instrument having a writing device 142 rigidly fixed to a gate loop 144. The gate loop and writing device are coaxial and aligned along axis 146. The gate loop may be an oval, rectangular, or semi-rectangular ring having a gate segment 148. The gate segment 148 may be a rigid portion of the loop that is pivotably attached to a side of the gate loop 144 (as shown in FIGS. 17 and 18) or to an end of the gate loop (as shown in FIG. 19). The gate segment 148 is biased in a closed position, as shown in FIGS. 17 and 19, and is opened by pivoting the segment so as to form a gap between the gate segment and the remaining portion of the gate loop 144. The gate segment 148 may include a pivoting gate, sliding latch gate, wire gate, flexible appendage gate or another type of gate suitable for a writing instrument. The aperture may also be enclosed by a solid loop enclosing structure with no gate.

The gate loop 144 is rigidly attached to an end of the writing device 140, such that the writing device does not swing with respect to the gate loop. Further, the rigid connection between the writing device and the gate loop allows the writing device to be used for writing while a person holds the gate loop. A person with weak finger strength may place the gate loop in his palm, and close his fingers and thumb over the ring while writing.

Figure 20:
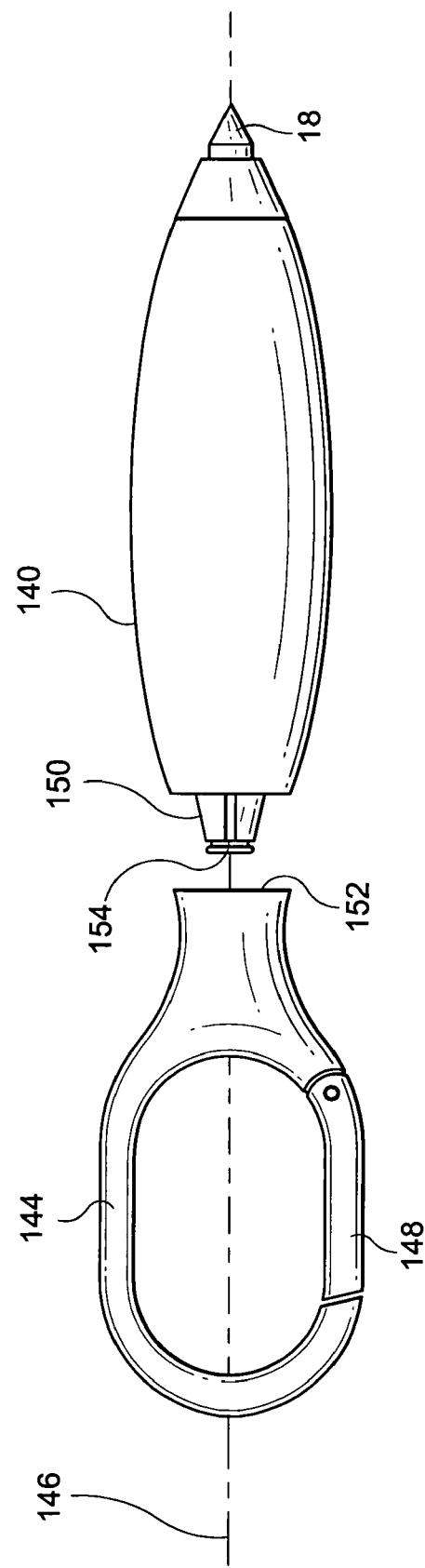

The gate loop 144 may detach from the writing device 142, as shown in FIG. 20. A post 150 extends axially from an end of the writing device opposite to the writing tip 18. The post 150 may have an annular groove 154 that snaps into a deformable ring groove coaxial with the axis 146 and seated in a mating aperture 152 of the gate 144. When the post is snapped into the aperture, the gate and writing device are rigidly held together. An axial groove 154 and an axial key on the post and in the aperture may be used to prevent rotational movement between the gate and writing device.

Figure 21:
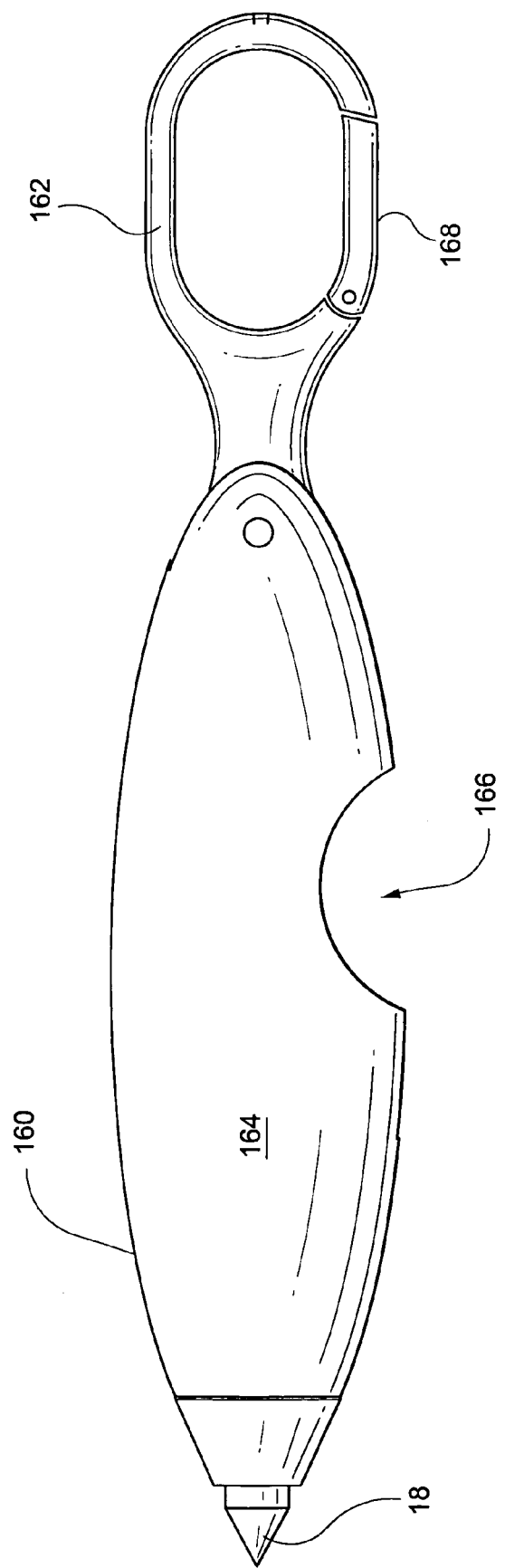
FIGS. 21 and 22 are side views of a tenth embodiment of the writing instrument.
Figure 22:
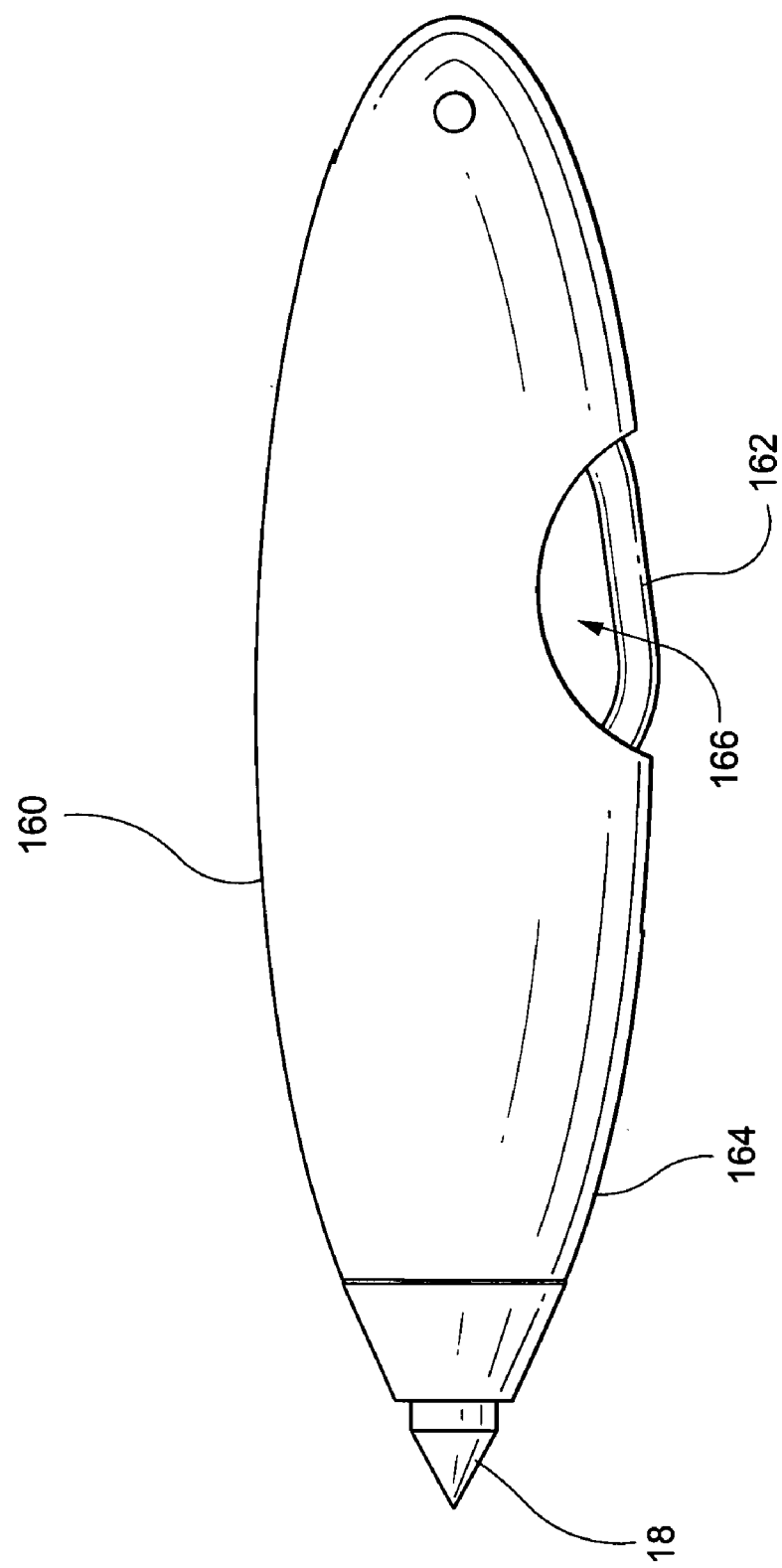

FIGS. 21 and 22 are side views respectively of a tenth embodiment 160 of the writing device. A gate loop 162 is pivotably attached to an end of the writing device 164 opposite to the writing tip 18. When extended (as shown in FIG. 21), the gate loop 162 is similar to the ninth embodiment 140 in that both have an oval gate loop 162, 144 coaxial to the writing device axis. The gate loop 162 may be rigid with respect to the writing device, due to a snap fit between the extended gate loop 162 and writing device 164. The gate loop pivots into a slot 166 in the body of the writing device, when the loop is not in use. The gate loop may be spring loaded to snap into an extended position, when a button is depressed on the body of the writing device. The gate loop may include a gate segment 168.

Figure 23:
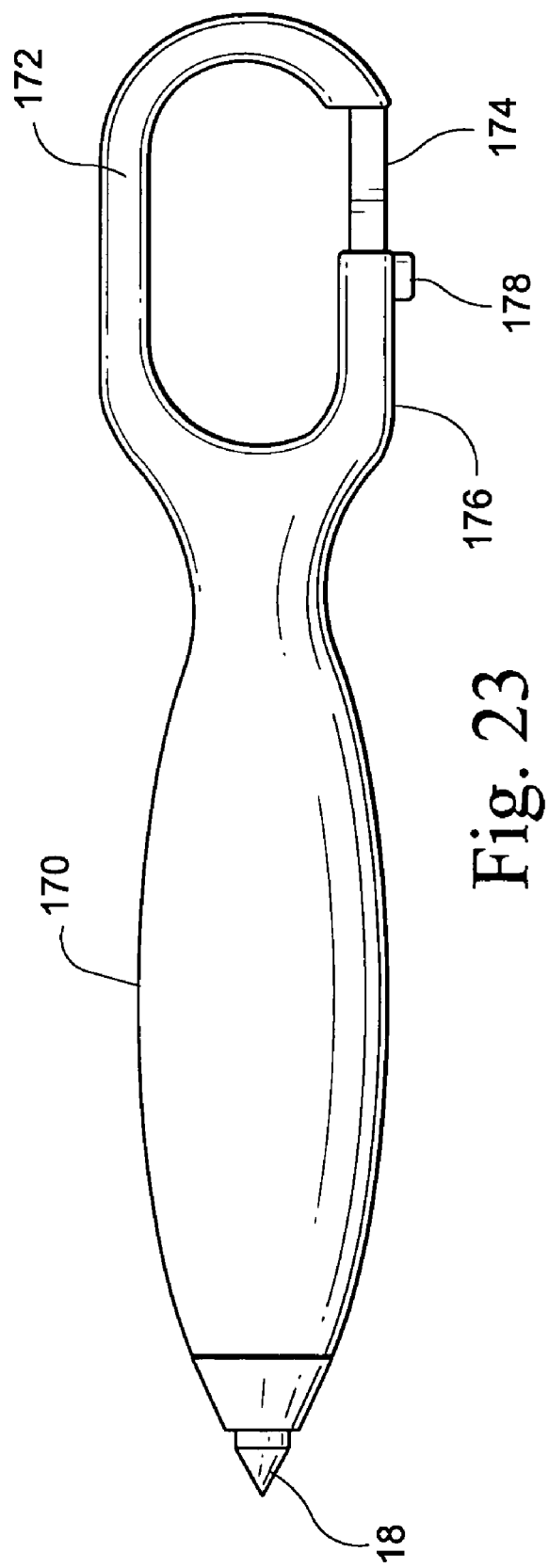
FIG. 23 is a side view of an eleventh embodiment of the writing instrument.

FIG. 23 is a side view of an eleventh embodiment 170 of the writing instrument, which is similar in many respects to the embodiment shown in FIGS. 17 to 19. The gate loop 172 includes a sliding latch segment 174 that reciprocally slides into a rigid portion 176 of the loop. The latch segment may include a sliding post 178 which can be moved back-and-forth by the thumb of a person opening and closing the latch segment. The latch segment operates in a manner similar to a conventional sliding latch on a dog leash.

Figure 24:
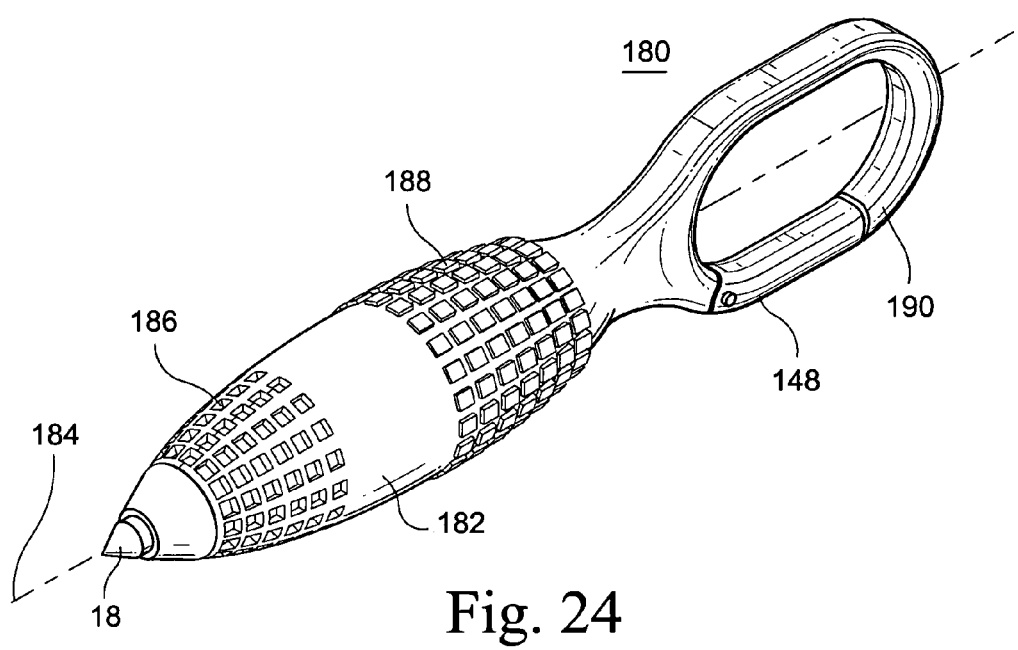
FIG. 24 is a perspective view of a twelfth embodiment of the writing instrument.

FIG. 24 is a perspective view of a twelfth embodiment 180 of the writing, which is similar in many respects to several of the other embodiments of the writing instruments. The writing instrument body 182 has a "bomb" outer shape, which is generally elliptical in a cross-section taken along an axis 184 and circular in a cross-section taken traverse to the axis. The outer surface of the body 182 has knurled gripping surfaces 186,188 which provide a rubberized grip. The surface texture, the number of gripping surfaces, and the placement of gripping surfaces on the body 182 of the writing instrument or even on the outer surface of the gate loop 190 is a matter of design selection for each embodiment of the writing instrument.

Figure 25:
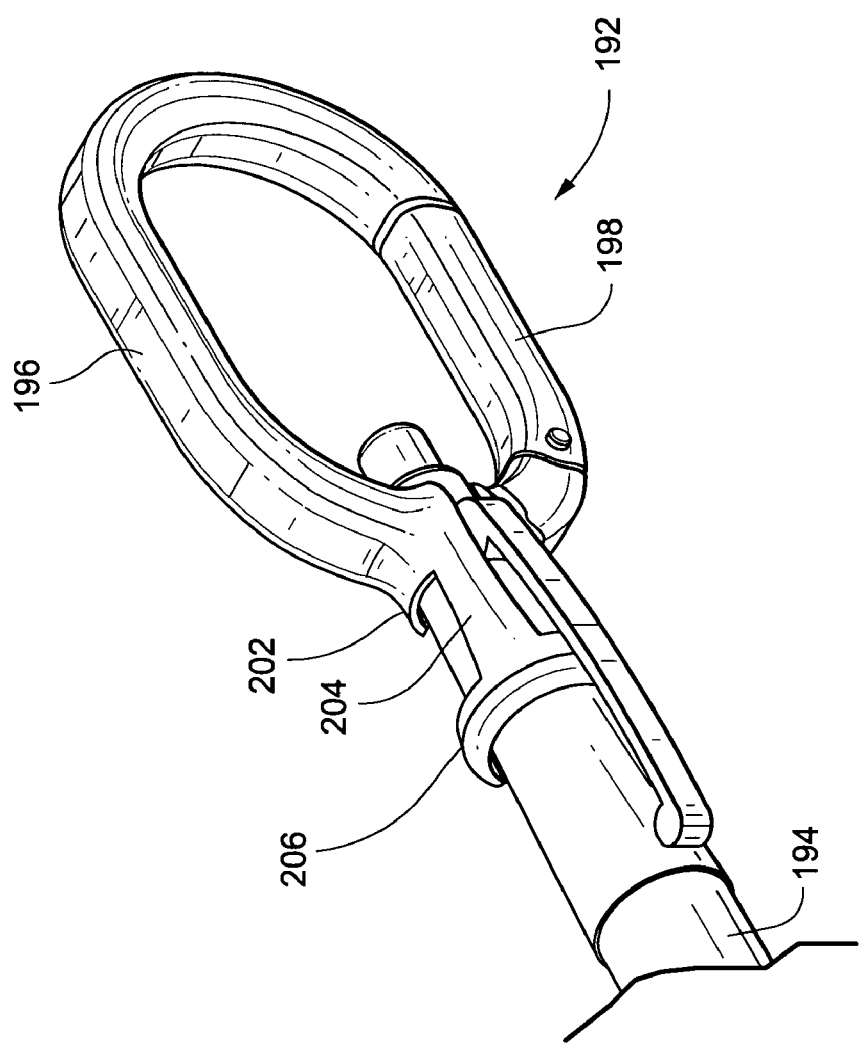
FIG. 25 is a front perspective view and FIG. 26 is a side view of another embodiment of a mountable gate.
Figure 26:
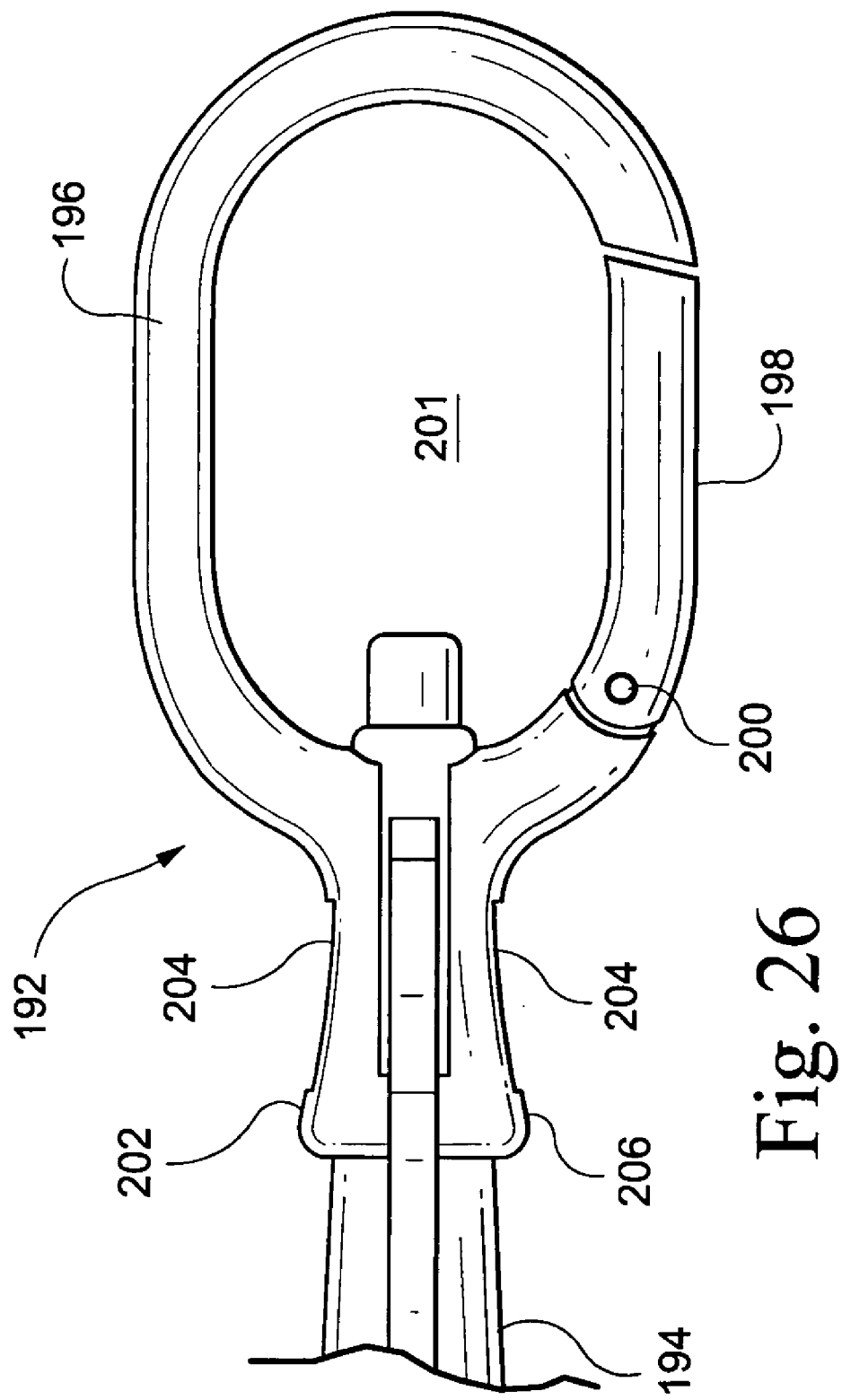

FIG. 25 is a front perspective view and FIG. 26 is a back view of another embodiment of a gate loop 192 that snaps onto a shaft 194 of a conventional writing device, such as a pen or pencil. The gate loop 192 includes an oval loop 196 with a gate segment 198 that pivots about a pin 200 attached to a fixed portion of the loop. An aperture 201 defined by the oval loop may be large enough to receive the four fingers and thumb of a hand carrying the gate loop and writing device assembly. The gate loop 192 has a stem 202 that attaches to an end of a writing shaft opposite to the writing tip. The stem 202 may have a pair of opposite side ribs 204 that are joined by a semi-annular sleeve 206 that snaps onto the shaft 194. The sleeve has a gap (not shown in FIGS. 25 and 26, but similar to the gap 129 shown in FIG. 14), to allow the sleeve to snap over the shaft as the gate loop 192 is attached to the writing device.

Figure 27:
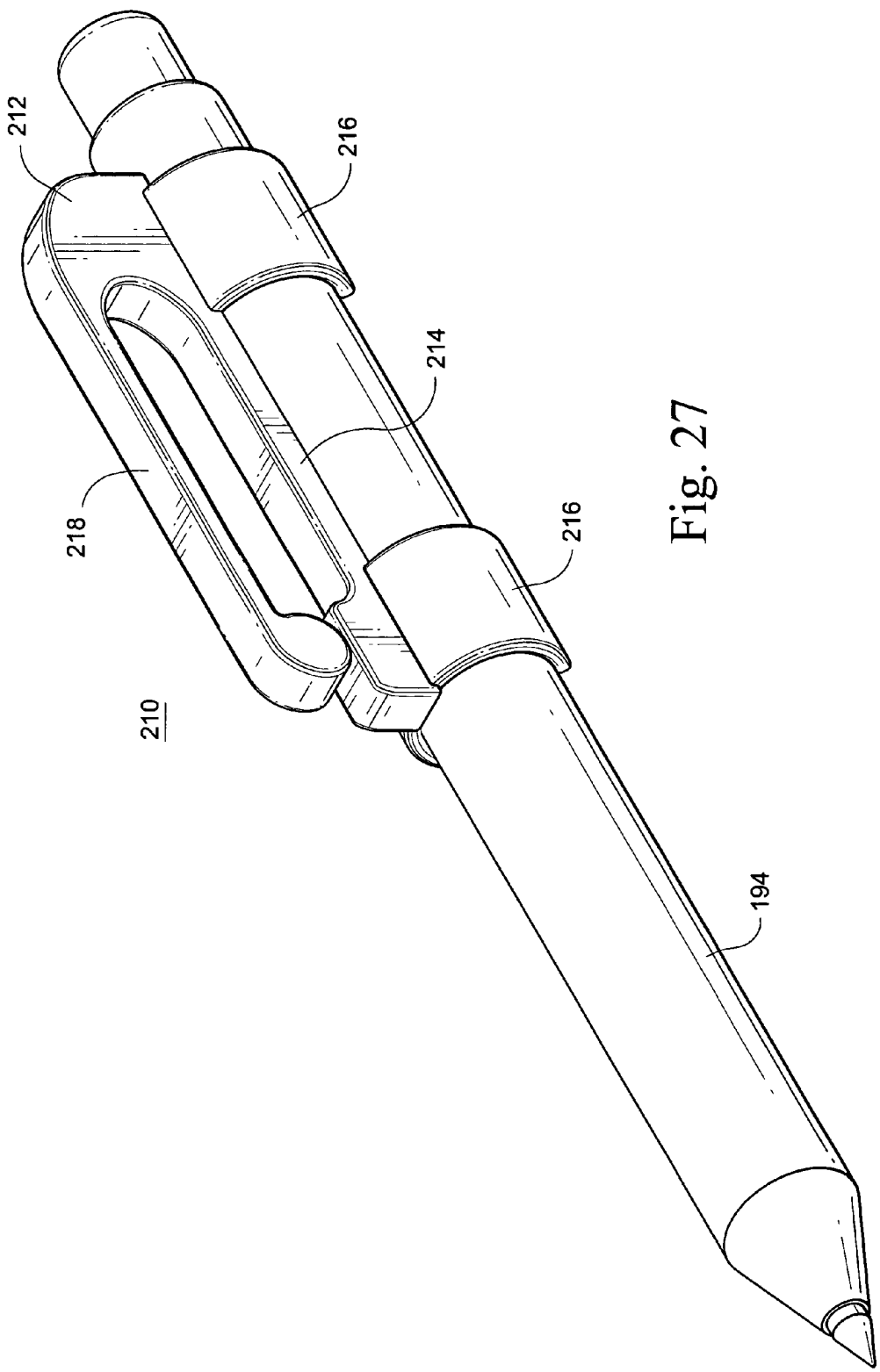
FIG. 27 is a perspective view of another mountable gate.

FIG. 27 shows a further embodiment of a mountable gate 210 that slides onto a conventional pen 194, pencil or other writing device with a shaft. The gate 210 includes a clip 212 having parallel legs including a rigid leg 214 attached to the pen 194 with a pair of sleeves 216 (similar to the sleeves 126 shown in FIGS. 14 to 16. The other leg 218 form a cantilevered beam similar to the clip on a common ink pen. The cantilevered leg 218 bends or twists to allow the pen to be clipped to a shirt pocket or other surface. The mountable gate allows users to attach a clip to a writing device 194 that does not otherwise have a clip. The clip gate could be attached to an automotive sun visor to provide a convenient place to "snap in" a favorite pen for quick access.

Figure 28:
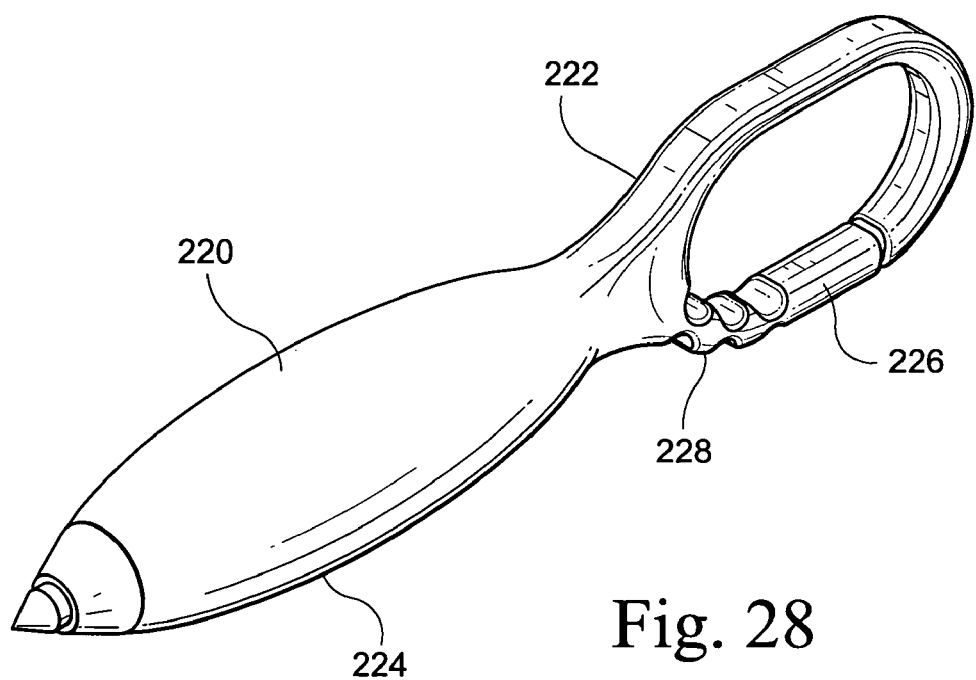
FIG. 28 is a perspective view of a thirteenth embodiment of the invention.

FIG. 28 shows an embodiment of a writing instrument 220 similar in many respects to the writing devices 140 and 180. The gate loop 222 fixed to the writing device 224 includes a gate segment 226 having a deformable ribbed section 228 that allows the gate to be opened and closed. The ribbed section 228 returns the gate segment to the closed position shown in FIG. 28, when no force is applied to the gate. The gate segment may be opened inwardly, outwardly or side-to-side by applying a force, such as by a thumb, to the gate.

Figure 29:
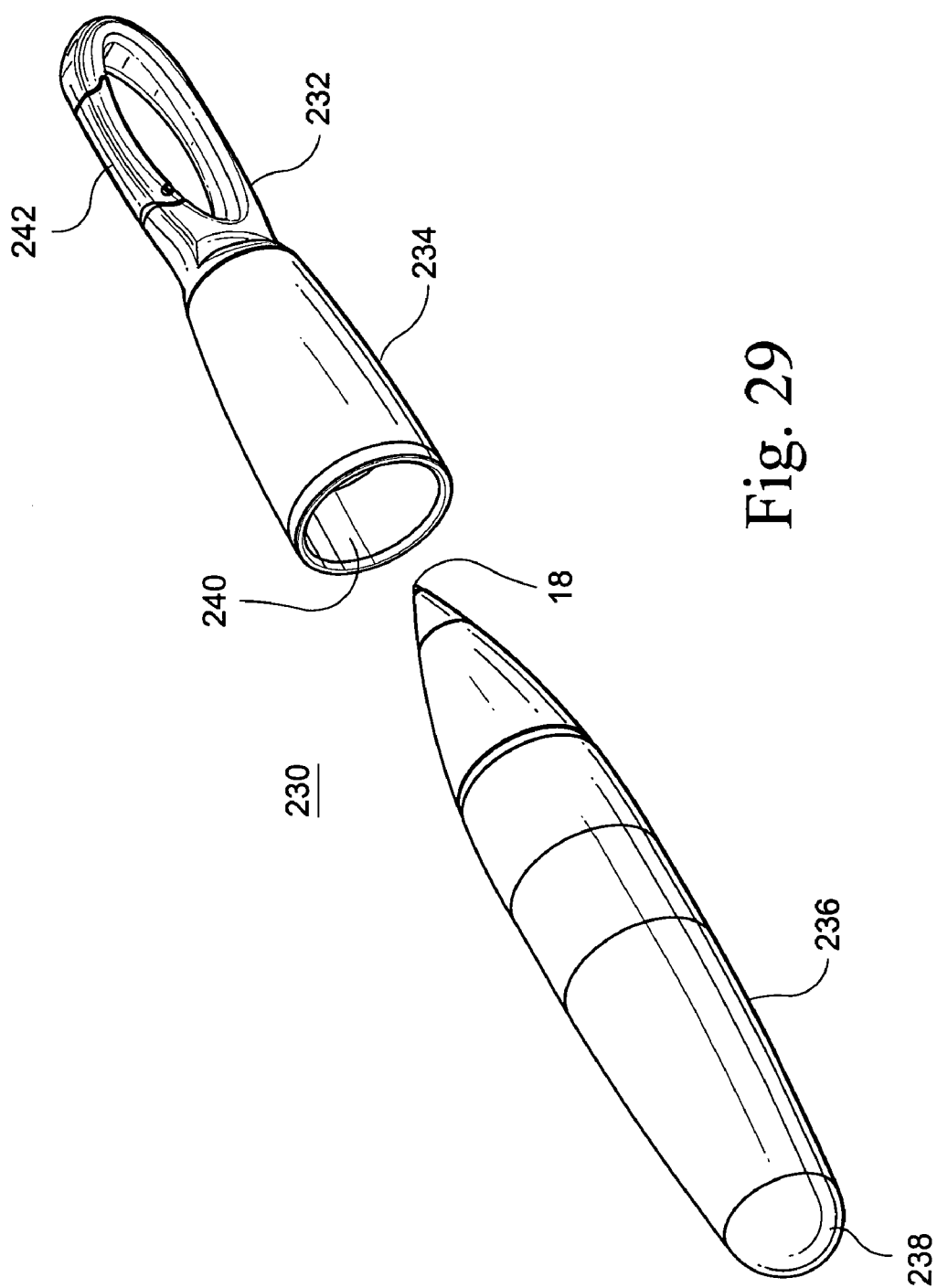
FIG. 29 is a perspective view of a fourteenth embodiment of the invention.

FIG. 29 shows a writing instrument 230 having a gate loop 232 which an open-ended housing 234 to receive an end of a writing device 236. The open end 240 of the gate loop housing 234 may receive the writing tipped 241 end of the writing device or may receive the opposite end 238 of the device. The gate loop 232 is rigidly attached to the housing 234. The gate loop may include a gate segment 242.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A writing instrument comprising:
   a writing leg having a writing tip extending from an end of the writing leg, wherein the writing tip dispenses a writing material to form an indicia of writing;
   a gate segment;
   a joint between the writing leg and the gate segment, wherein the joint is proximate to the writing tip, includes a grip fixed to and extending from the writing leg, said grip has an end opposite to the writing leg which is adjacent the gate segment at least when the gate segment is in a closed position, and said grip is to be grasped between a forefinger and thumb of a hand while the hand writes with the writing tip, and
   a third leg attached at one end to the writing leg at a location distal to the writing tip and having an opposite end adjacent to the gate segment when the gate segment is in a closed position, wherein said writing leg, gate segment and third leg define an aperture sufficiently large to receive a plurality of fingers simultaneously of a hand.

2. A writing instrument as in claim 1 wherein the joint has recesses in opposite sides of the joint, and said recesses are adapted to receive a forefinger when the writing leg is grasped.

3. A writing instrument as in claim 1 wherein the gate segment further comprises a leg pivotably attached to the joint.

4. A writing instrument as in claim 3 wherein the gate segment comprises a gate from a gate group consisting of a pivoting gate, sliding latch gate, a wire gate and a flexible appendage gate.

5. A writing instrument as in claim 1 wherein the gate segment further comprises a dimpled or knurled surface.

6. A writing instrument as in claim 1 wherein said gate segment further comprises textured surfacing.

7. A writing instrument as in claim 6 wherein said textured surfacing is a rubberized coating.

8. A writing instrument as in claim 1 wherein the writing leg further comprises a conduit extending axially through the writing leg and a writing device removably mounted into said conduit, wherein said writing tip is at an end of the writing device.

9. A writing instrument as in claim 1 wherein the aperture is sufficiently large to receive the plurality of fingers when the hand is grasping the writing instrument.

10. A writing instrument as in claim 1 wherein the writing leg, gate segment and third leg form a carabiner.

11. A writing instrument as in claim 1 wherein the writing tip is a stylus.

12. A writing instrument comprising:
   a carabiner body having a writing leg with a writing tip, said writing tip dispensing a writing material forming a writing indicia, and
   a gate leg having a pivoting gate segment and a fixed gate post, wherein the gate post is rigidly fixed to and extending outward from the writing leg proximate to the writing tip and said post including an end opposite to the writing leg adjacent the gate segment at least when the segment is closed.

13. A writing instrument as in claim 12 further comprising a third leg spanning the writing leg and gate leg and said third leg attaches to said writing leg distal to said writing tip.

14. A writing instrument as in claim 12 further comprising a writing device having a shaft and the writing tip at one end of the shaft, wherein said writing device slides into a conduit extending through said writing leg.

15. A writing instrument as in claim 12 further comprising a writing device having a shaft and a nose at one end of the shaft, wherein said nose has an outer surface contiguous with an outer surface of the writing leg, said writing tip extends from said nose and the writing device slides into a conduit extending through said writing leg.

16. A writing instrument as in claim 12 wherein the gate segment comprises a gate from a group of gates consisting of a pivoting gate, a sliding latch gate, a wire gate and a flexible appendage gate.

17. A writing instrument comprising:
   a writing leg having a writing tip at one end, said writing tip dispensing a writing fluid to form a writing indicia;
   a handle having opposite ends attached to the writing leg,
   a first joint between the writing leg and the handle, wherein the first joint is proximate to the writing tip and includes a grip rigidly fixed to and extending from the writing leg and said grip is to be grasped between a forefinger and thumb of a hand while the hand writes with the writing tip, and
   an aperture defined by the writing leg and the handle, wherein the aperture is sufficiently large to receive a plurality of fingers simultaneously of the hand grasping the writing instrument.

18. A writing instrument as in claim 17 having a first writing mode wherein the writing leg is held between a thumb and at least one finger of a hand and a second writing mode wherein the hand grasps the handle during writing.

19. A writing instrument as in claim 17 wherein the handle is attached at one end to a location on the writing leg proximate to the writing tip, and the grip between the one end of the handle and the writing leg has at least one recess to receive a finger of a hand grasping the writing leg.

20. A writing instrument as in claim 17 wherein the grip on the joint between the handle and the writing leg is substantially thinner than the writing leg.

21. A writing instrument as in claim 17 wherein said handle includes a gate segment and said aperture forms a gate loop.

22. A writing instrument as in claim 21 wherein the gate loop and writing leg are coplaner.

23. A writing instrument as in claim 21 wherein the gate loop and writing leg are integral.

24. A writing instrument as in claim 21 wherein the gate loop is detachable from the writing device.

25. A writing instrument as in claim 21 wherein the gate loop includes said aperture adapted to receive fingers simultaneously of a hand for grasping the gate loop.

26. A writing instrument as in claim 21 wherein the gate loop includes said gate segment pivotably attached to the loop.

* * * * *